US009205787B2

(12) United States Patent
Yoshioka et al.

(10) Patent No.: US 9,205,787 B2
(45) Date of Patent: Dec. 8, 2015

(54) VEHICLE COUNTING DEVICE AND VEHICLE COUNTING METHOD

(75) Inventors: Mototaka Yoshioka, Osaka (JP); Shinichi Yoshizawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 336 days.

(21) Appl. No.: 13/596,535

(22) Filed: Aug. 28, 2012

(65) Prior Publication Data

US 2012/0323532 A1 Dec. 20, 2012

Related U.S. Application Data

(63) Continuation of application No. PCT/JP2011/007357, filed on Dec. 28, 2011.

(30) Foreign Application Priority Data

Jan. 12, 2011 (JP) .................... 2011-004371

(51) Int. Cl.
 *B60R 16/00* (2006.01)
 *G08G 1/16* (2006.01)
(52) U.S. Cl.
 CPC ............ *B60R 16/00* (2013.01); *G08G 1/166* (2013.01); *G08G 1/16* (2013.01)
(58) Field of Classification Search
 CPC .................................. B60R 16/00; G08G 1/16
 USPC .............. 702/66, 70–73, 77, 128, 189, 190; 340/435; 381/56; 701/300, 301
 See application file for complete search history.

(56) References Cited

U.S. PATENT DOCUMENTS

| 2010/0030562 A1* | 2/2010 | Yoshizawa et al. ........... 704/270 |
| 2010/0214086 A1 | 8/2010 | Yoshizawa et al. |
| 2010/0228482 A1* | 9/2010 | Yonak .......................... 701/301 |

FOREIGN PATENT DOCUMENTS

| JP | 4-261592 | 9/1992 |
| JP | 5-92767 | 12/1993 |
| JP | 6-111176 | 4/1994 |

(Continued)

OTHER PUBLICATIONS

International Search Report issued Mar. 27, 2012 in International Application No. PCT/JP2011/007357.

(Continued)

*Primary Examiner* — Manuel L Barbee
(74) *Attorney, Agent, or Firm* — Wenderoth, Lind & Ponack, L.L.P.

(57) ABSTRACT

A vehicle counting device including: a frequency analysis unit that analyzes a frequency of a surrounding sound detected by a vehicle sound detection microphone; a vehicle sound candidate selection unit that selects, as one or more vehicle sound candidates, one or more sounds included in the surrounding sound, based on the analysis by the frequency analysis unit, each of the one or more sounds being in a frequency band where a sound pressure is greater than or equal to a predetermined threshold value; a phase curve calculation unit that calculates, for each of the one or more vehicle sound candidates, a phase curve; and a vehicle count determination unit that classifies the one or more phase curves into at least one group, based on shapes of the one or more phase curves, and determines a total number of the at least one group as the number of the nearby vehicles.

8 Claims, 26 Drawing Sheets

(56) References Cited

FOREIGN PATENT DOCUMENTS

| | | |
|---|---|---|
| JP | 6-227339 | 8/1994 |
| JP | 7-182594 | 7/1995 |
| JP | 2806048 | 9/1998 |
| JP | 2000-99853 | 4/2000 |
| JP | 2011-242343 | 12/2011 |
| WO | 2010/035434 | 4/2010 |

OTHER PUBLICATIONS

Hiroyuki Hoshino, "Approaching vehicles detection system by using vehicle noise for driver support (Doraiba Shien No Tame No Soko-on Ni Yoru Sekkin Sharyo Kenchi Shisutemu)", The Journal of the Acoustical Society of Japan, vol. 62, No. 3, 2006, pp. 265-274 (with partial English translation).

* cited by examiner

FIG. 14

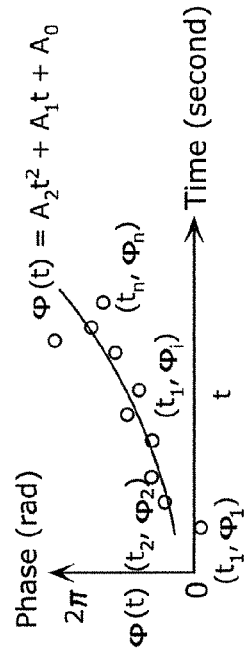

<Quadratic regression analysis>

$\varphi(t) = A_2 t^2 + A_1 t + A_0$

When condition $S_{(t,t)} \times S_{(txt,txt)} - S_{(t,txt)} \times S_{(t,txt)} \neq 0$ is satisfied, regression analysis is preformed. (when condition is not satisfied, section is invalid.)

$A_2 = \dfrac{S_{(txt,\varphi)} \times S_{(t,t)} - S_{(t,\varphi)} \times S_{(t,txt)}}{S_{(t,t)} \times S_{(txt,txt)} - S_{(t,txt)} \times S_{(t,txt)}}$ $A_1 = \dfrac{S_{(t,\varphi)} \times S_{(txt,txt)} - S_{(t,txt)} \times S_{(t,tx\varphi)}}{S_{(t,t)} \times S_{(txt,txt)} - S_{(t,txt)} \times S_{(t,txt)}}$ $A_0 = \dfrac{\sum \varphi_i}{n} - A_1 \times \dfrac{\sum t_i}{n} - A_2 \times \dfrac{\sum (t_i)^2}{n}$ $S_{(t,t)} = \sum(t_i \times t_i) - \dfrac{\sum t_i \times \sum t_i}{n}$ $S_{(t,\varphi)} = \sum(t_i \times \varphi_i) - \dfrac{\sum t_i \times \sum \varphi_i}{n}$ $S_{(t,txt)} = \sum(t_i \times t_i \times t_i) - \dfrac{\sum t_i \times \sum(t_i \times t_i)}{n}$ $S_{(txt,\varphi)} = \sum(t_i \times t_i \times \varphi_i) - \dfrac{\sum(t_i \times t_i) \times \sum \varphi_i}{n}$ $S_{(txt,txt)} = \sum(t_i \times t_i \times t_i \times t_i) - \dfrac{\sum(t_i \times t_i) \times \sum(t_i \times t_i)}{n}$ i: Index of data
n: Number of data
$S_{(a,b)}$: Covariance of a and b
$t_i \times t_i$, $t_i \times t_i \times t_i$, $t_i \times t_i \times t_i \times t_i$ are calculated in advance

VEHICLE COUNTING DEVICE AND VEHICLE COUNTING METHOD

CROSS REFERENCE TO RELATED APPLICATIONS

This is a continuation application of PCT Patent Application No. PCT/JP2011/007357 filed on Dec. 28, 2011, designating the United States of America, which is based on and claims priority of Japanese Patent Application No. 2011-004371 filed on Jan. 12, 2011. The entire disclosures of the above-identified applications, including the specifications, drawings and claims are incorporated herein by reference in their entirety.

TECHNICAL FIELD

One or more exemplary embodiments disclosed herein relate generally to devices that determine the number of vehicles, and particularly to a device that detects the number of vehicles, using one or more vehicle sounds from at least one other vehicle around a user vehicle.

BACKGROUND ART

Examples of a conventional technique of determining a situation of a vehicle around a user vehicle include the following techniques.

In the first conventional technique, a surrounding sound is converted into a sound pressure level signal. An absolute quantity of the sound pressure level signal in a specific frequency band is compared with a determination level. It is determined, using the comparison result, whether or not a vehicle is present around a user vehicle. In addition, it is determined whether or not another vehicle is approaching, based on a time dependency of the sound pressure level signal (see Patent Literature (PTL) 1, for instance).

CITATION LIST

Patent Literature

[PTL 1]
Japanese Unexamined Patent Application Publication No. 2000-99853
[PTL 2]
Japanese Patent No. 2806048

Non Patent Literature

[NPL 1]
Approaching vehicles detection system by using vehicle noise for driver support (Doraiba Shien No Tame No Soko-on Ni Yoru Sekkin Sharyo Kenchi Shisutemu). *The Journal of the Acoustical Society of Japan* vol. 62, no. 3 (2006): 265-274

SUMMARY OF INVENTION

Technical Problem

In the first conventional technique (PTL 1 and NPL 1), a surrounding sound in a frequency band such as 1000 Hz is converted into a sound pressure level signal, an absolute quantity of the sound pressure level signal in the specific frequency band is compared with a determination level so as to determine whether or not a nearby vehicle is present and determine whether or not the nearby vehicle is approaching, based on a time dependency of the sound pressure level signal (see FIG. 3 of PTL 1, for example). Although, however, it is possible to detect the approaching vehicle, because the high frequency band such as 1000 Hz includes a friction sound between tires and a road surface (a sound of vehicle tires) that is produced by a moving vehicle, when vehicles are present, it is not possible to determine the number of the vehicles. This is because the tire moving sound extends over a wide range such as a range from 800 Hz to 1200 Hz and has no characteristics for use in distinction depending on vehicles. In other words, whether one or two vehicles are present, sound pressure appears in a similar frequency band, and thus not only is it impossible to determine the number of vehicles, but it is difficult to detect more than one vehicle (see NPL 1, page 271).

The second conventional technique (PTL 2) relates to distinguishing, using harmonic information, timbres produced by different musical instruments. Each of the musical instruments produces a sound in a unique frequency band. In addition, the frequency band has a so-called harmonic structure having a fundamental frequency, a frequency twice as high as the fundamental frequency, and so on. Furthermore, sounds in the frequency band are always produced simultaneously. Thus, assuming that one musical instrument produces a frequency having certain sound pressure simultaneously generated and a frequency twice as high as the frequency, each of musical instruments is classified into a group, and a music score is created for each musical instrument.

However, a sound emanating from a vehicle, especially an engine sound, has a unique timbre depending on a vehicle, and is not limited to be a harmonic. Moreover, an SN ratio is small due to a noise such as a noise of the wind or influence such as reflection and diffraction caused by a building or the like in the actual environment, and thus it is difficult to distinguish vehicles by simply using sound pressure information of a specific frequency.

On non-limiting and exemplary embodiment provides a vehicle counting device which accurately determines the number of vehicles, using vehicle sounds from other vehicles around a user vehicle.

Solution to Problem

In one general aspect, the techniques disclosed here feature a vehicle counting device that determines the number of nearby vehicles, using one or more vehicle sounds, the vehicle counting device including: a frequency analysis unit that analyzes a frequency of a surrounding sound that includes the one or more vehicle sounds and is detected by a vehicle sound detection microphone; a vehicle sound candidate selection unit that selects, as one or more vehicle sound candidates, one or more sounds included in the surrounding sound, based on a result of the analysis by the frequency analysis unit, each of the one or more sounds being in a frequency band where a sound pressure is greater than or equal to a predetermined threshold value; a phase curve calculation unit that calculates, for each of the selected one or more vehicle sound candidates, a phase curve indicating a time dependency of a phase; and a vehicle count determination unit that classifies the calculated one or more phase curves into at least one group, based on shapes of the calculated one or more phase curves, and determines a total number of the at least one group as the number of the nearby vehicles.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects of Invention

One or more exemplary embodiments or features disclosed herein provide a vehicle counting device and a vehicle counting method which accurately determine the number of vehicles, using vehicle sounds from other vehicles around a user vehicle. Subsequently, the vehicle counting device and the vehicle counting method notify a driver or the like of the user vehicle of the determined number of the vehicles, to support safe driving.

BRIEF DESCRIPTION OF DRAWINGS

These and other advantages and features will become apparent from the following description thereof taken in conjunction with the accompanying Drawings, by way of non-limiting examples of embodiments of the present disclosure.

In the Drawings:

FIG. 14 is a diagram illustrating adjustment processing for a phase.

DESCRIPTION OF EMBODIMENTS

Figure 1:
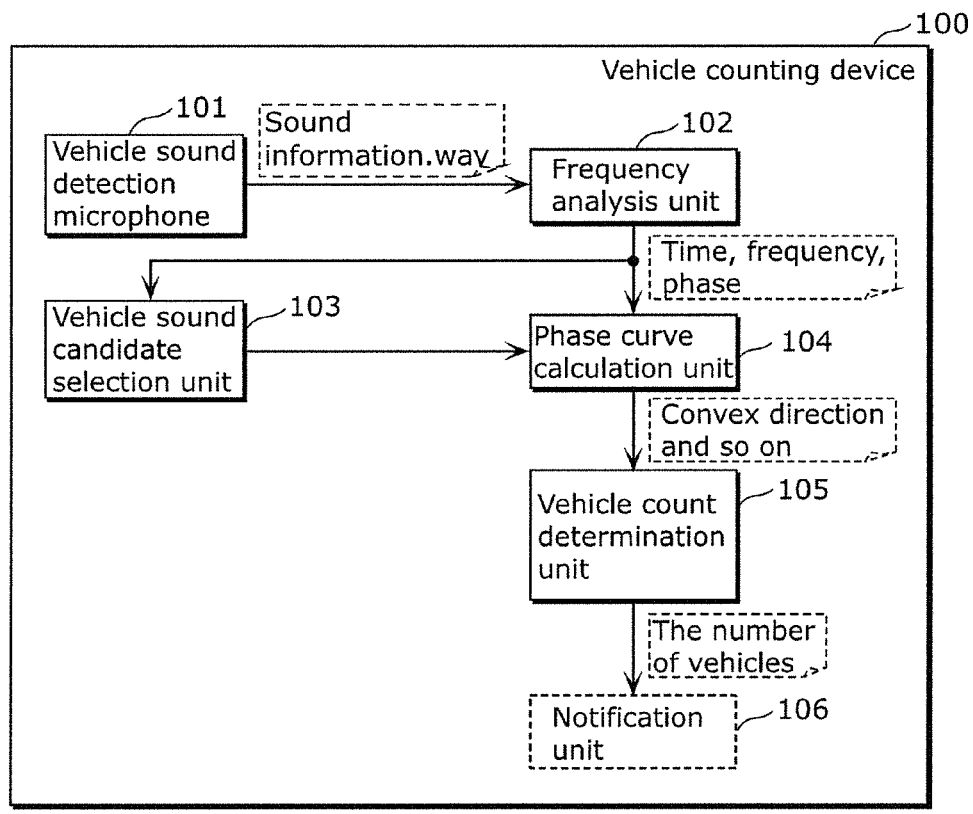
FIG. 1 is a block diagram showing a configuration of a vehicle counting device according to Embodiment 1.

According to an exemplary embodiment disclosed herein, a vehicle counting device determines the number of nearby vehicles, using one or more vehicle sounds, the vehicle counting device including: a frequency analysis unit that analyzes a frequency of a surrounding sound that includes the one or more vehicle sounds and is detected by a vehicle sound detection microphone; a vehicle sound candidate selection unit that selects, as one or more vehicle sound candidates, one or more sounds included in the surrounding sound, based on a result of the analysis by the frequency analysis unit, each of the one or more sounds being in a frequency band where a sound pressure is greater than or equal to a predetermined threshold value; a phase curve calculation unit that calculates, for each of the selected one or more vehicle sound candidates, a phase curve indicating a time dependency of a phase; and a vehicle count determination unit that classifies the calculated one or more phase curves into at least one group, based on shapes of the calculated one or more phase curves, and determines a total number of the at least one group as the number of the nearby vehicles. In this way, it is possible to determine the number of the nearby vehicles, based on the shapes of the phase curves corresponding to the one or more vehicle sounds, that is, properties unique to the vehicle sounds. Thus, it is possible to accurately detect the number of vehicles around a user vehicle, using the one or more vehicle sounds.

For example, the phase curve calculation unit may calculate, for each of the selected one or more vehicle sound candidates, a quadratic approximate curve as the phase curve, based on a phase of a signal in each of time periods, the signal indicating the vehicle sound candidate. Here, the number of vehicles determination unit may classify the calculated one or more phase curves into the at least one group, based on a degree of similarity among quadratic coefficients of the one or more calculated quadratic approximate curves. In this way, it is possible to first determine a degree of similarity among acceleration and deceleration states of vehicles, and then determine the number of the vehicles even when plural vehicle sound candidates are present, because the number of the vehicles is determined by using the degree of similarity among the convex directions of the phase curves, and it is also possible to more accurately determine the number of the vehicles even in a complex situation such as a situation where plural vehicles are approaching.

For instance, the vehicle counting device may further include a vehicle sound extraction unit that calculates an error between a phase resulting from the analysis by the frequency analysis unit and a phase on the phase curve calculated by the phase curve calculation unit, and extracts, from regions resulting from the analysis by the frequency analysis unit, a region corresponding to a vehicle sound, based on the calculated error, wherein the number of vehicles determination unit may determine the number of the nearby vehicles, using a phase curve in the extracted region corresponding to the vehicle sound. In this way, it is possible to more accurately determine the number of the vehicles by using regions in a frequency spectrum each of which indicates a time dependency of a phase that is similar to a moving state (constant speed, acceleration, or deceleration) of a vehicle, that is, using only regions corresponding not to noises such as wind but to the vehicle sounds.

For example, the vehicle counting device may further include a notification unit that performs notification of the determined number of the nearby vehicles. Here, the notification unit may perform the notification in different modes depending on whether the determined number of the nearby vehicles is one or plural, or may perform the notification by sound. In this way, it is possible to notify the driver or the like of the number of the vehicles, thereby ensuring safe driving.

It is to be noted that these general and specific aspects are not only implemented using the vehicle counting device including such characteristic processing units but also may be implemented using a vehicle counting method including, as steps, the characteristic processing units of the vehicle counting device, and a computer program causing a computer to execute the characteristic steps of the vehicle counting method. It goes without saying that such a program can be distributed via a nonvolatile recording medium such as a Compact Disc-Read Only Memory (CD-ROM) or a communication network such as the Internet.

Hereinafter, certain exemplary embodiments are described in greater detail with reference to the accompanying Drawings. Each of the exemplary embodiments described below shows a general or specific example. The numerical values, shapes, structural elements, the arrangement and connection of the structural elements, steps, the processing order of the steps etc. shown in the following exemplary embodiments are mere examples, and therefore do not limit the inventive concept, the scope of which is defined in the appended Claims and their equivalents. Therefore, among the structural elements in the following exemplary embodiments, structural elements not recited in any one of the independent claims defining the most generic part of the inventive concept are described as arbitrary structural elements.

Embodiment 1

The following describes a vehicle counting device according to Embodiment 1.

FIG. 1 is a block diagram showing a configuration of a vehicle counting device 100 according to Embodiment 1. The vehicle counting device 100 shown by FIG. 1 is a device which determines, based on vehicle sounds from other vehicles around a user vehicle, the number of the other vehicles, and includes: a vehicle sound detection microphone 101 which detects vehicle sounds from other vehicles; a frequency analysis unit 102; a vehicle sound candidate selection unit 103; a phase curve calculation unit 104; a vehicle count determination unit 105; and a notification unit 106. It is to be noted that each description near a directional line indicates main data transmitted along the directional line in FIG. 1. In addition, although the notification unit 106 is not an essential element of the vehicle counting device 100, since it is desirable that the vehicle counting device 100 include the notification unit 106 (the notification unit 106 is an optional element), the notification unit 106 is shown by a dotted frame. The same holds true for another block diagram.

The vehicle sound detection microphone 101 is a microphone which detects a surrounding sound including vehicle sounds, that is, a microphone which detects at least vehicle sounds emanating from other vehicles such as engine sounds, motor sounds, and moving sounds, and outputs sound information (e.g., sound data in WAV format as shown by FIG. 1). It is to be noted that when a microphone mounted on the user vehicle is used as the vehicle sound detection microphone 101, since the vehicle sound detection microphone 101 simultaneously detects noises such as a wind noise, the vehicle sound detection microphone 101 detects a mixed sound including vehicle sounds and noises.

Figure 2:
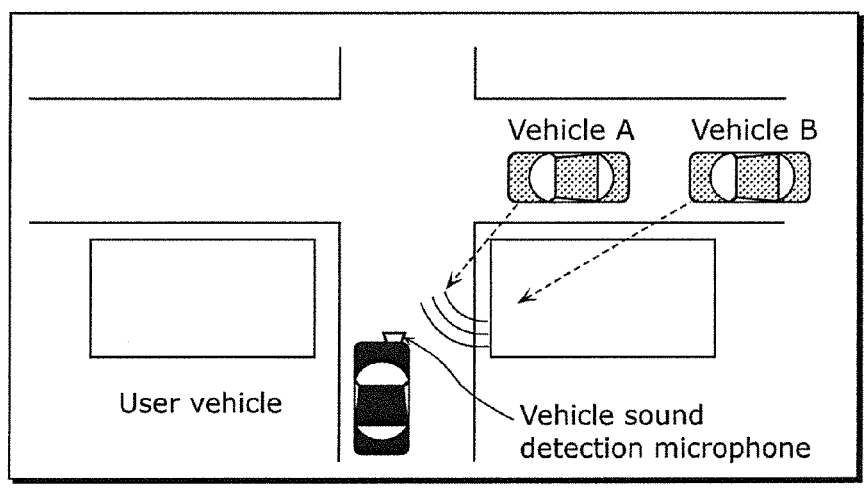
FIG. 2 is a diagram illustrating vehicle sounds.

FIG. 2 is a diagram illustrating vehicle sound detection performed by the vehicle sound detection microphone 101. The figure shows that a user vehicle is approaching an intersection and two vehicles (vehicles A and B) are approaching the intersection from right. The vehicle sound detection microphone 101 mounted at a predetermined position on the user vehicle detects sounds (hereafter, referred to as "vehicle sounds") from the vehicles A and B approaching the intersection. Here, examples of the predetermined position on the user vehicle include a front part of a hood, a roof, and a door mirror.

The frequency analysis unit 102 performs a frequency analysis on the surrounding sound detected by the vehicle sound detection microphone 101. For instance, the frequency analysis unit 102 performs the Fourier transform on the surrounding sound, to obtain a frequency signal, an amplitude, a phase, and the like of the surrounding sound. It is to be noted that the Fourier transform performed by the frequency analysis unit 102 may be frequency transform using another frequency transform method such as a fast Fourier transform and the discrete cosine transform. More specifically, the frequency analysis unit 102 analyzes, for each analysis section that is a combination of one of predetermined time periods and one of predetermined frequency bands, sound pressure of the surrounding sound detected by the vehicle sound detection microphone 101, based on the surrounding sound.

Figure 3:
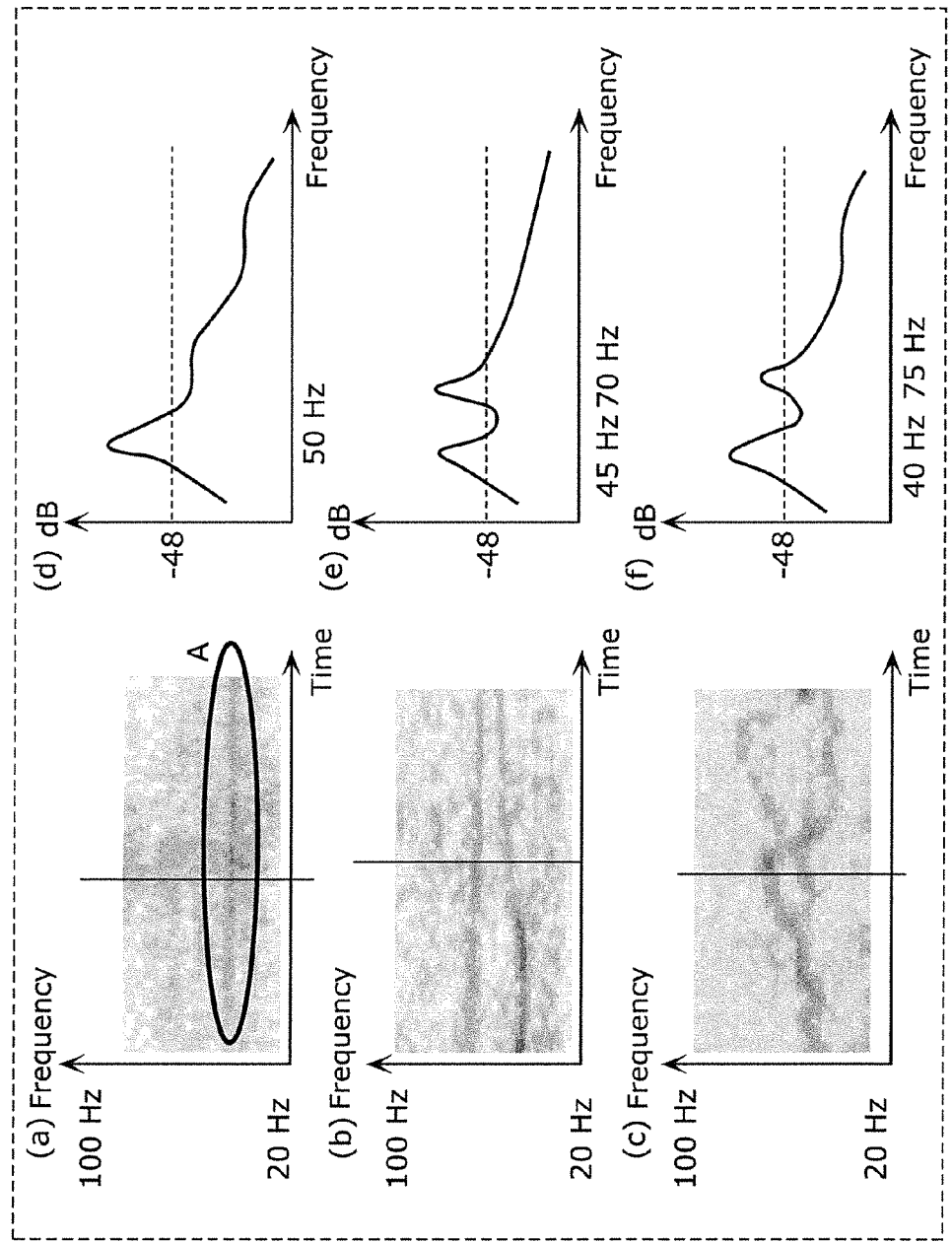
FIG. 3 is a graph illustrating a vehicle sound.

Each of (a), (b), and (c) of FIG. 3 is a spectrogram showing a result obtained by the frequency analysis unit 102 performing a frequency analysis on an actual engine sound of a vehicle detected by the vehicle sound detection microphone 101. Here, the vertical axis represents a frequency, and the horizontal axis represents time. The density in the spectrogram represents a magnitude of power (i.e., sound pressure) of a frequency signal, and a dense portion indicates a greater magnitude of power.

In an engine, a predetermined number of cylinders make piston motion to cause revolutions to a power train. An engine sound emanating from a vehicle includes: a sound dependent on engine revolutions; and a fixed vibration sound and an aperiodic sound that are independent of the engine revolutions. In particular, a main sound detectable from the outside of the vehicle is a periodic sound dependent on the engine revolutions. In this embodiment, attention is focused on the periodic sound dependent on the engine revolutions. In addition, an engine structure and engine revolutions differ from vehicle to vehicle, and thus a timbre differs. When plural vehicles are present, plural frequencies have a great magnitude of power in a spectrogram.

(a) of FIG. 3 is, for example, a spectrogram for a vehicle sound obtained by the frequency analysis unit 102 when one vehicle is moving. The horizontal axis represents time, and the horizontal axis represents a frequency. As stated above, the engine sound is detected in a low frequency band from 20 Hz to 200 Hz or the like. The engine sound has a uniform timbre like a sine wave, and power at a specific frequency. In (a) of FIG. 3, a line of blackish part A appears. This part A represents the engine sound, and has predetermined power. (d) of FIG. 3 shows a frequency spectrum at a certain time in the spectrogram shown by (a) of FIG. 3. Here, the horizontal axis represents a frequency, and the vertical axis represents power (dB). It is clear from (d) of FIG. 3 that the engine sound has a peak at 50 Hz.

In contrast, each of (b) and (c) of FIG. 3 is a spectrogram for vehicle sounds obtained by the frequency analysis unit 102 when two vehicles are present. The horizontal axis represents time, and the horizontal axis represents a frequency. It is clear that an engine sound appears as a line. In each of (b) and (c) of FIG. 3, however, it is clear that two lines appear because of the two vehicles. Since an engine sound and engine revolutions often differ from vehicle to vehicle, when two or more vehicles are present, engine sounds are detected as timbres as many as the number of vehicles. Here, the engine sounds appear as blackish lines. (e) and (f) of FIG. 3 show frequency spectrums at certain times in the spectrograms shown by (b) and (c) of FIG. 3, respectively. Here, the horizontal axis represents a frequency, and the vertical axis represents power (dB). It is clear from (e) of FIG. 3 that the engine sound has peaks at 45 Hz and 70 Hz, respectively. In addition, it is clear from (f) of FIG. 3 that the engine sound has peaks at 40 Hz and 75 Hz, respectively.

The vehicle sound candidate selection unit 103 selects, as a vehicle sound candidate, a sound in a frequency band having sound pressure greater than or equal to a predetermined threshold value, from the surrounding sound, based on the analysis by the frequency analysis unit 102. In this embodiment, for instance, the vehicle sound candidate selection unit 103 selects, as the vehicle sound candidate, a frequency signal greater than or equal to a predetermined sound pressure threshold value for distinguishing between a vehicle sound and a noise, using the predetermined sound pressure threshold value. The predetermined sound pressure threshold value is, for example, −48 dB. Here, when a frequency spectrum is searched for a peak by using a peak search method or the like, and the number of peaks greater than or equal to a predetermined threshold value (−48 dB) is determined, it is possible to determine the number of the peaks as the number of vehicles. There is a case where a detectable vehicle sound is searched for a peak, using only the frequency having the greatest power such as a fundamental frequency and a predetermined frequency, due to the influence of surrounding noise or background noise, especially in the actual environment. Thus, as stated above, the number of the peaks greater than or equal to the predetermined threshold value may be determined as the number of the vehicles, using the predetermined threshold value. Alternatively, a noise level may be determined in advance by a spectrum subtraction method, and a remaining portion may be used as a vehicle sound.

There is, however, a case where even when one vehicle is present, peaks appear in frequency bands in a frequency spectrum actually obtained.

Figure 4:
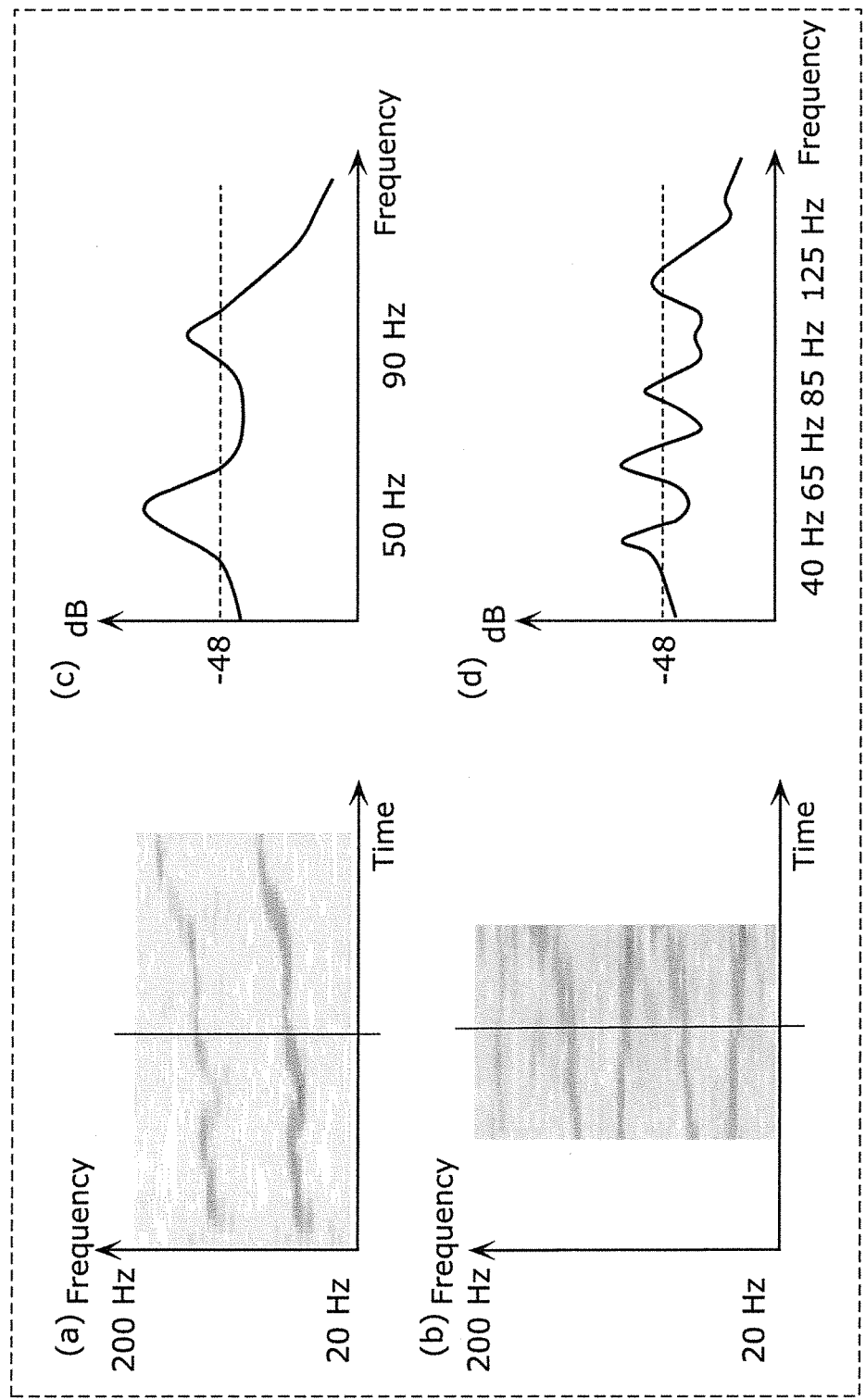
FIG. 4 is a graph illustrating a vehicle sound.

For instance, (a) of FIG. 4 is a spectrogram obtained by the frequency analysis unit 102 when one vehicle is present. Here, the horizontal axis represents time, and the horizontal axis represents a frequency. As previously stated, an engine sound is detected. As shown by the spectrogram in (a) of FIG. 4, however, even though one nearby vehicle is present, two lines of blackish part appear. (c) of FIG. 4 shows a frequency spectrum at a certain time in the spectrogram shown by (a) of FIG. 4. Here, the horizontal axis represents a frequency, and the vertical axis represents power (dB). It is clear from (c) of FIG. 4 that the engine sound has peaks at 50 Hz and 90 Hz at the certain time. As just described, the number of peaks appearing in the frequency spectrum for the vehicle sound from the one vehicle is not always limited to one, and can be in the plural. Although the frequency spectrum has the two peaks in (c) of FIG. 4, the frequency spectrum may have plural peaks such as three peaks and four peaks. In addition, the peaks are not necessarily peaks located at harmonics, and often have power at a given position for each vehicle. Thus, in such a case, it is difficult to accurately determine the number of vehicles such as whether one or two nearby vehicles are present, based simply on the number of the peaks in the frequency spectrum.

In addition, when vehicles are present, it is more difficult to determine whether or not the vehicles are present, based only on a frequency band or power.

For example, (b) of FIG. 4 is a spectrogram obtained by the frequency analysis unit 102 when two vehicles are present. Here, the horizontal axis represents time, and the horizontal axis represents a frequency. The spectrogram represents an actual situation where one vehicle is moving at a constant speed and another vehicle is accelerating from behind to approach the vehicle moving at the constant speed, that is, a situation where the two vehicles are approaching. Here, four lines of blackish part appear. (d) of FIG. 4 shows a frequency spectrum at a certain time in the spectrogram shown by (b) of FIG. 4. Here, the horizontal axis represents a frequency, and the vertical axis represents power (dB). It is clear from (d) of FIG. 4 that the engine sounds have peaks at 40 Hz, 65 Hz, 85 Hz and, 125 Hz at the certain time. As just described, there is a case where the number of peaks appearing in the frequency spectrum is four even when one vehicle is present, and thus it is difficult to determine whether one vehicle is present or plural vehicles such as two vehicles and four vehicles are present, based simply on the number of the peaks.

Especially, in a situation where vehicles are present and approaching, when it is wrongly determined that one vehicle is present, and a driver of a user vehicle is notified of only the presence of the one vehicle but not of the presence of the other approaching vehicles, there is a high possibility that the driver enters an intersection without worry after the one vehicle passes in front of the user vehicle, and subsequently the user vehicle collides with any of the other vehicles that are not detected. Thus, it is necessary to accurately determine the number of vehicles, and notify the determined number of the vehicles.

Furthermore, there is a possibility that a vehicle sound is canceled out by a noise of the wind, reflection, diffraction, and so on in the actual environment. In addition, in vehicle detection, it is necessary to determine instantaneously the presence or absence of a vehicle, and notify the presence of the vehicle.

In view of the above, in this embodiment, the vehicle counting device 100 determines the number of vehicles, using not only sound pressure (power) but also a phase, among information resulting from the frequency analysis by the frequency analysis unit 102. To do so, the vehicle counting device 100 according to this embodiment includes the phase curve calculation unit 104. The phase curve calculation unit 104 calculates, for each vehicle sound candidate selected by the vehicle sound candidate selection unit 103, a phase curve showing a time dependency of a phase.

Figure 5:
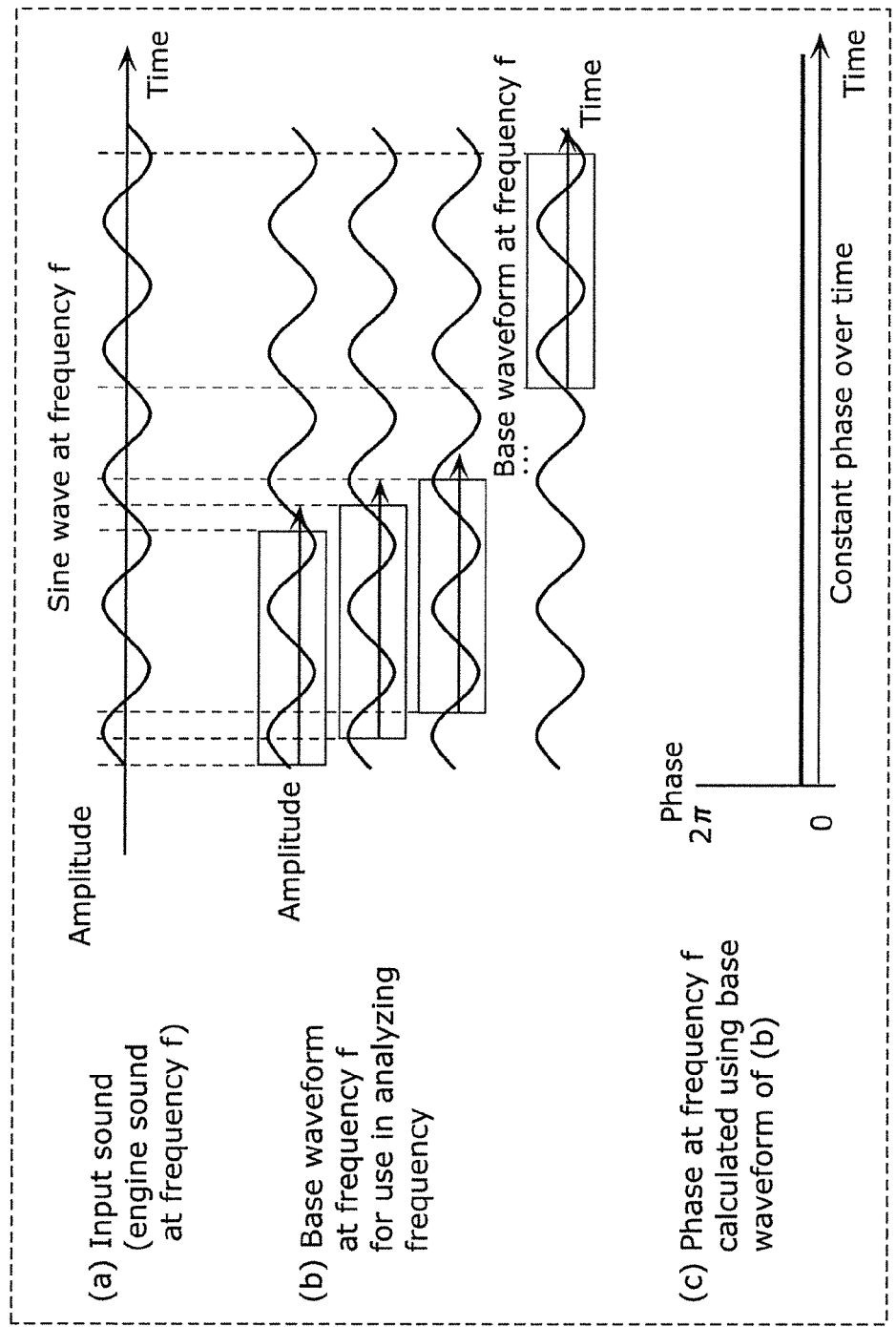
FIG. 5 is a diagram illustrating a phase.

Here, the term "phase" used in the present disclosure is defined with reference to FIG. 5. (a) of FIG. 5 schematically shows an exemplary waveform of a received engine sound. Here, the horizontal axis represents time, and the vertical axis represents amplitude. More specifically, (a) of FIG. 5 shows an exemplary waveform of an engine sound when RPM of an engine stay constant relative to a time (the passage of time) and a frequency of the engine sound stays constant.

Moreover, (b) of FIG. 5 shows a sine wave at a predetermined frequency f which is a base waveform used when a frequency analysis is performed using the Fourier transform. (Here, a value which is equal to the frequency of the engine sound is used as the predetermined frequency f.) The horizontal axis and the vertical axis are the same as those in (a) of FIG. 5. A frequency signal (more specifically, a phase) is calculated by performing the convolution operation on the base waveform and a received sound (i.e., a mixed sound). In this example, by fixing the base waveform without shifting the base waveform along the temporal axis and by performing the convolution operation on the base waveform and the received engine sound, the frequency signal (phase) is calculated for each of the times.

(c) of FIG. 5 shows the result obtained by the above process. Here, the horizontal axis represents time, and the vertical axis represents a phase. In this example, the RPM stay constant relative to the time, and the frequency of the received engine sound stays constant relative to the time. For this reason, the phase at the predetermined frequency f stays constant, that is, the phase "neither increases at an accelerating rate nor decreases at an accelerating rate." It is to be noted that although the value which is equal to the frequency of the engine sound when the RPM stay constant is used as the predetermined frequency f in the above example, when a value which is smaller than the frequency of the engine sound is used as the predetermined frequency f, a phase which is calculated by the convolution operation using the base waveform of such a frequency f increases in a linear function manner. In addition, when a value which is larger than the frequency of the engine sound is used as the predetermined frequency f, a phase which is calculated by the convolution operation using the base waveform of such a frequency f decreases in a linear function manner. In either case (cases where the frequency of the base waveform, that is, the predetermined frequency f is smaller than, larger than, and equal to the frequency of the engine sound), the phase at the predetermined frequency f shows a variation represented by a linear function, and neither increases at an accelerating rate nor decreases at an accelerating rate.

It is to be noted that, in the sound signal processing, the fast Fourier transform (FFT), and so on, it is common to perform the convolution operation while the base waveform is being shifted along the temporal axis. When the convolution operation is performed while the base waveform is being shifted along the temporal axis, it is possible to correct a phase resulting from the convolution operation, to convert the phase into the phase defined in the present disclosure. The following describes the correction and conversion with reference to the drawings. In this embodiment, the base waveform is fixed without being shifted along the temporal axis, and a phase resulting from the convolution operation performed on the base waveform and the received engine sound is also referred to as a corrected phase.

Figure 6:
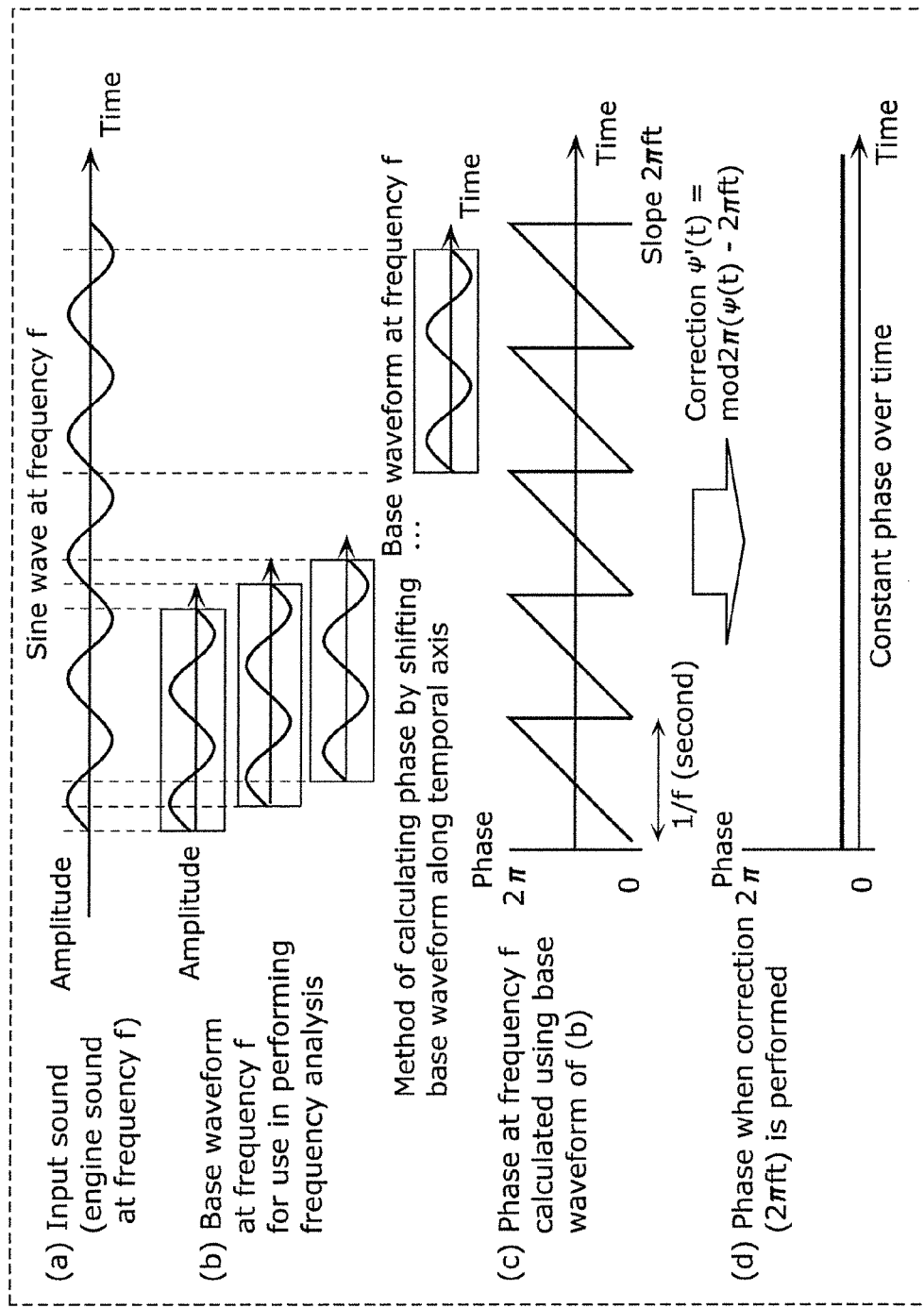
FIG. 6 is a diagram illustrating a phase.

FIG. 6 is a diagram illustrating a method of correcting a phase. (a) of FIG. 6 schematically shows an exemplary waveform of a received engine sound. Here, the horizontal axis represents time, and the vertical axis represents amplitude.

Moreover, (b) of FIG. 6 shows a sine wave at a predetermined frequency f which is a base waveform used when a frequency analysis is performed using the Fourier transform. (Here, a value which is equal to the frequency of the engine sound is used as the predetermined frequency f.) The horizontal axis and the vertical axis are the same as those in (a) of FIG. 6. A frequency signal (more specifically, a phase) is calculated by performing the convolution operation on the base waveform and a received sound (i.e., a mixed sound). In this example, by shifting the base waveform along the temporal axis and by performing the convolution operation on the base waveform and the received engine sound, the frequency signal (phase) is calculated for each of the times.

(c) of FIG. 6 shows the result obtained by the above process. Here, the horizontal axis represents time, and the vertical axis represents a phase. Since the frequency of the received engine sound is the frequency f, the pattern of the phase at the frequency f is an upward slope repeated regularly on a cycle of 1/f. By correcting the regularly repeated pattern of the calculated phase $\psi(t)$, a corrected phase $(\psi'(t)=\text{mod } 2\pi(\psi(t)-2\pi ft))$ (where f is an analysis frequency) is obtained as shown by (d) of FIG. 6. To put it differently, even when the phase is calculated by performing the convolution operation while the base waveform is being shifted along the temporal axis, performing the phase correction makes it possible to convert the phase into the phase defined in the present disclosure shown by (c) of FIG. 5.

In this embodiment, the phase shown by FIG. 5, that is, the corrected phase is used. In addition, for the convenience of description, the phase calculated in FIG. 6 while the base waveform is being shifted along the temporal axis is referred to as a phase before correction, and a corrected phase is referred to as a "phase after correction." Thus, the "phase" used in this embodiment is the "phase after correction."

Figure 7:
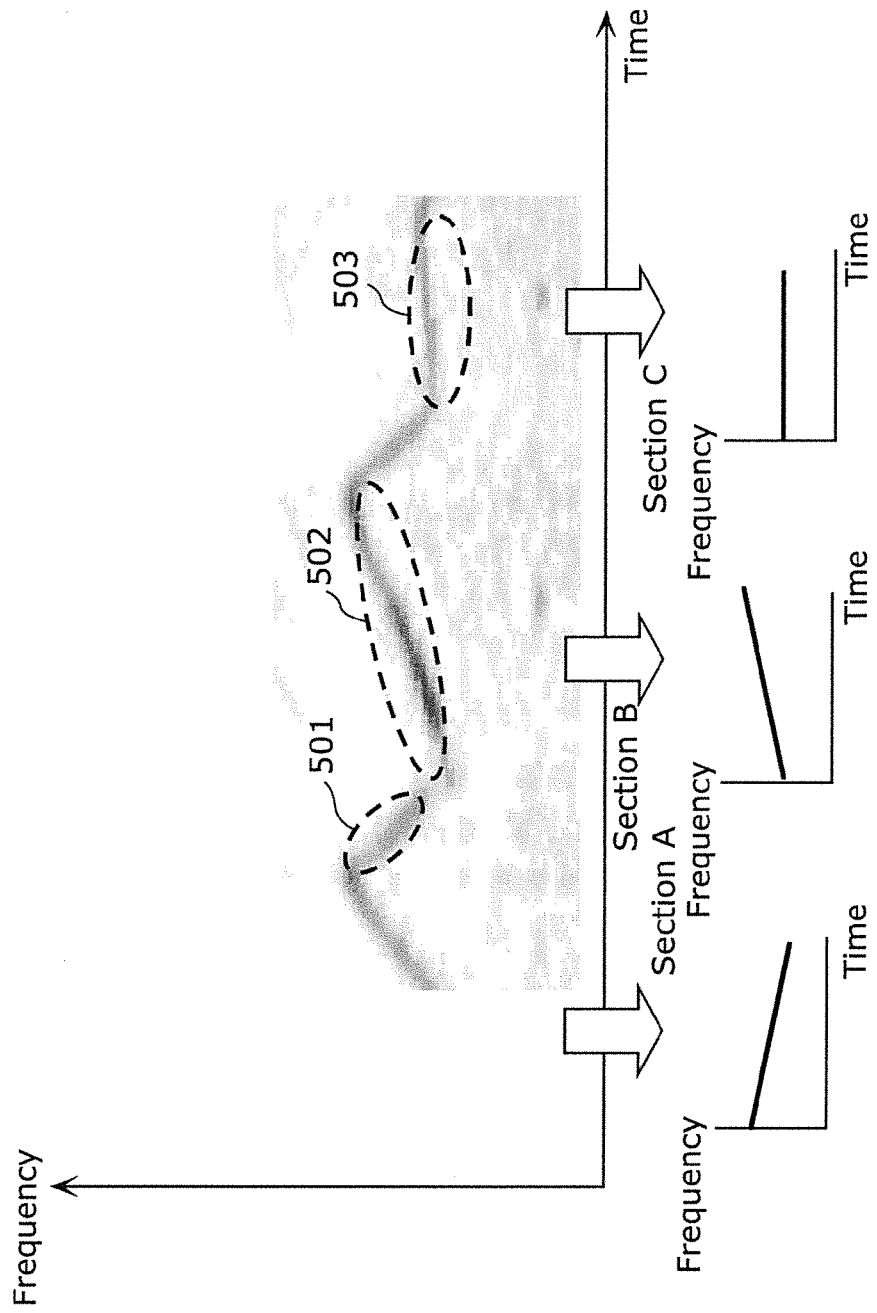
FIG. 7 is a graph illustrating an engine sound.

FIG. 7 is a spectrogram for an engine sound emanating from an actual vehicle. More specifically, FIG. 7 is a spectrogram for a vehicle sound when one vehicle is moving while changing a speed (RPM). Here, the horizontal axis represents time, and the horizontal axis represents a frequency. It is clear from FIG. 7 that the engine sound appears as a line. It is to be noted that although, even when the one vehicle is actually present, the engine sound occasionally includes timbres unique to the vehicle such that the engine sound appears as two lines or three lines, for the convenience of description, a period in which the engine sound appears as the one line is used as an example here.

As shown by dotted circles 501 to 503 in FIG. 7, the variation in RPM clearly causes the frequency of the engine sound indicated by each streak (each peak) in the spectrogram to vary partially according to a time.

Here, when attention is focused on the variation of the frequency indicated by the streak (the peak) in the spectrogram, the frequency seldom varies randomly and is seldom discrete. The frequency clearly fluctuates in a predetermined manner at predetermined time intervals. For instance, the frequency indicated by the streak (the peak) clearly decreases in the section A shown by FIG. 7. The vehicle is decelerating due to the decrease in RPM in the section A. The frequency indicated by the line (the peak) clearly increases in the section B shown by FIG. 7. The vehicle is accelerating due to the increase in RPM in the section B. In addition, the frequency indicated by the streak (the peak) clearly stays almost constant in the section C shown by FIG. 7. The vehicle is moving at a constant speed due to certain RPM.

Figure 8:
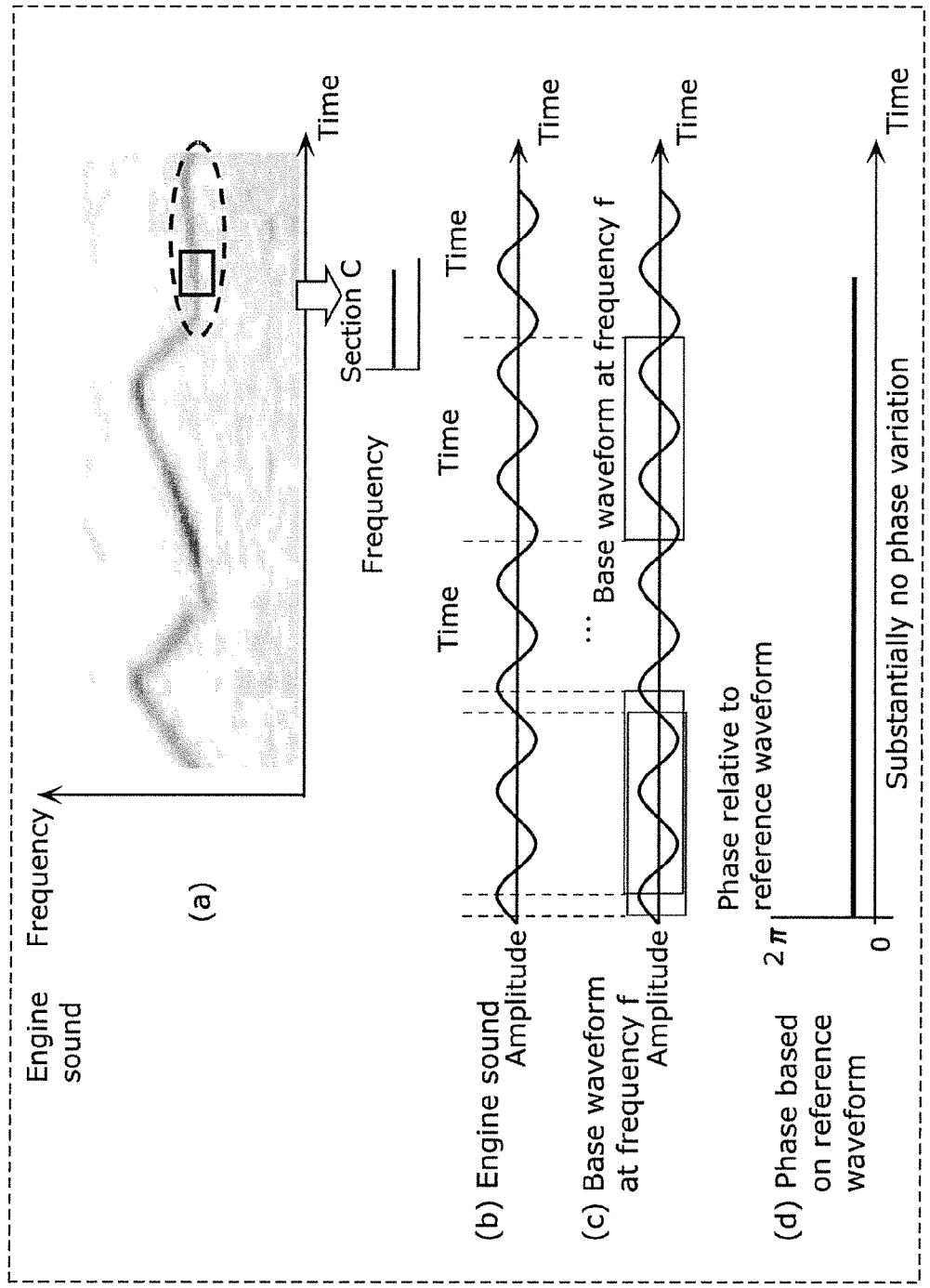
FIG. 8 is a diagram illustrating a phase of an engine sound at certain revolutions per minute (RPM).

The following describes a relationship between the decrease or increase in RPM and the phase of the engine sound. (a) of FIG. 8 is a diagram showing only the section C of the spectrogram shown by FIG. 7. (b) of FIG. 8 is a diagram schematically showing a waveform of an engine sound at certain RPM, in the section C shown by FIG. 7. Here, a frequency of the engine sound is represented by f. (c) of FIG. 8 is a diagram showing a base waveform. Here, a frequency of the base waveform is represented by the same value as the frequency f of the engine sound. (d) of FIG. 8 is a graph showing a phase of the engine sound relative to the base waveform. The engine sound at the certain RPM has certain periodicity like the sine wave shown by (b) of FIG. 8. For this reason, as shown by (d) of FIG. 8, the phase at the predetermined frequency f stays constant with respect to a time change, that is, neither increases at an accelerating rate nor decreases at an accelerating rate.

It is to be noted that when a target sound has a certain frequency and the frequency of the base waveform is lower than that of the target sound, a phase is delayed gradually. Since, however, an amount of decrease is constant, the phase decreases linearly. In contrast, when a target sound has a certain frequency and the frequency of the base waveform is higher than that of the target sound, a phase is advanced gradually. Since, however, an amount of increase is constant, the phase increases linearly.

Figure 9:
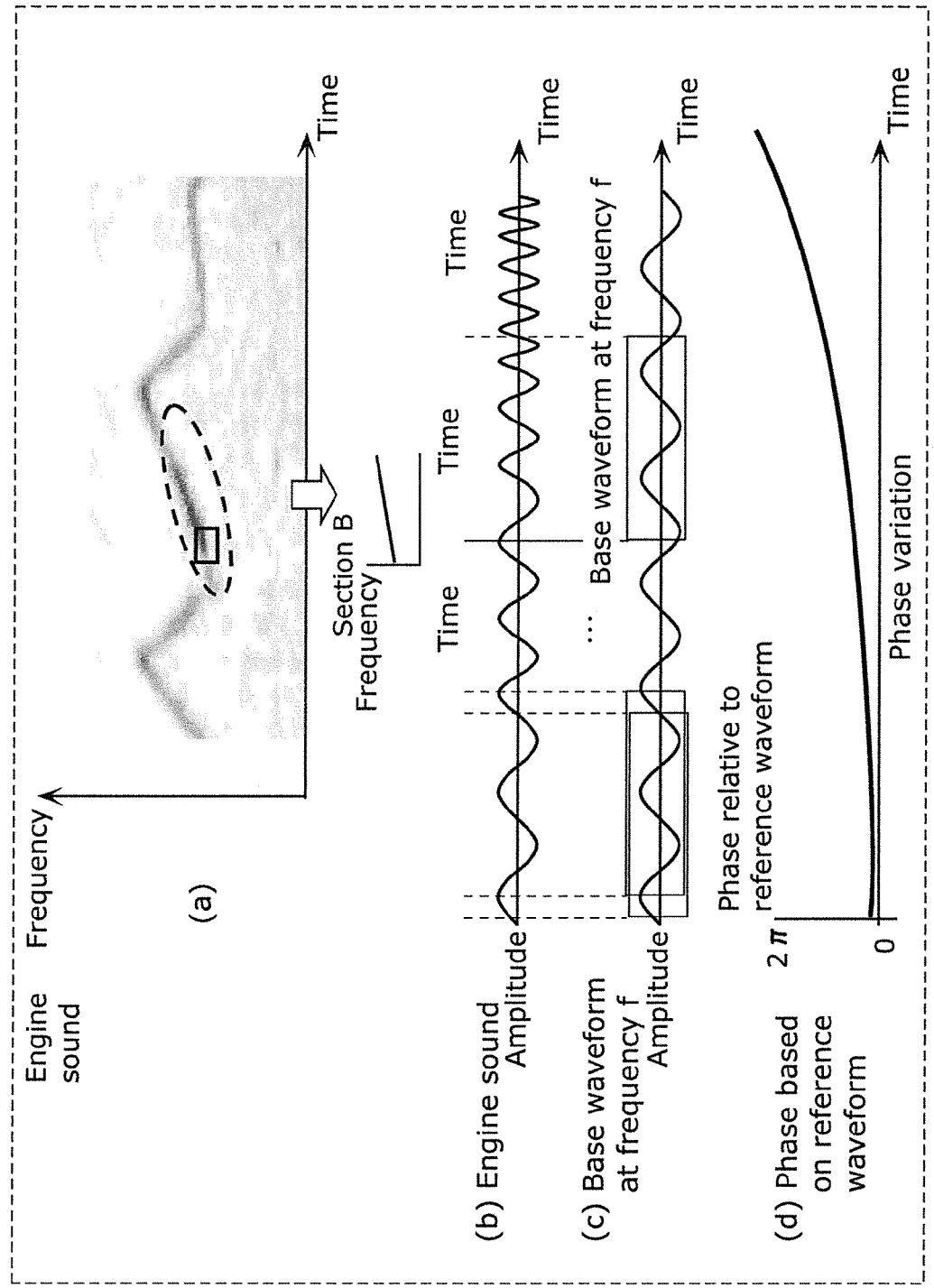
FIG. 9 is a diagram illustrating a phase of an engine sound when a vehicle accelerates due to an increase in RPM.

(a) of FIG. 9 is a diagram showing only the section B of the spectrogram shown by FIG. 7. (b) of FIG. 9 is a diagram schematically showing a waveform of an engine sound when a vehicle is accelerating due to an increase in RPM, in the section B shown by FIG. 7. Here, a frequency of the engine sound increases with time. (c) of FIG. 9 is a diagram showing a base waveform. For example, a frequency of the base waveform is represented by f. (d) of FIG. 9 is a graph showing a phase relative to the base waveform. Since the engine sound has periodicity like the sine wave, and a waveform whose cycle becomes shorter gradually ((b) of FIG. 9), as shown by (d) of FIG. 9, the phase of the engine sound relative to the base waveform increases at an accelerating rate with respect to a time change.

Figure 10:
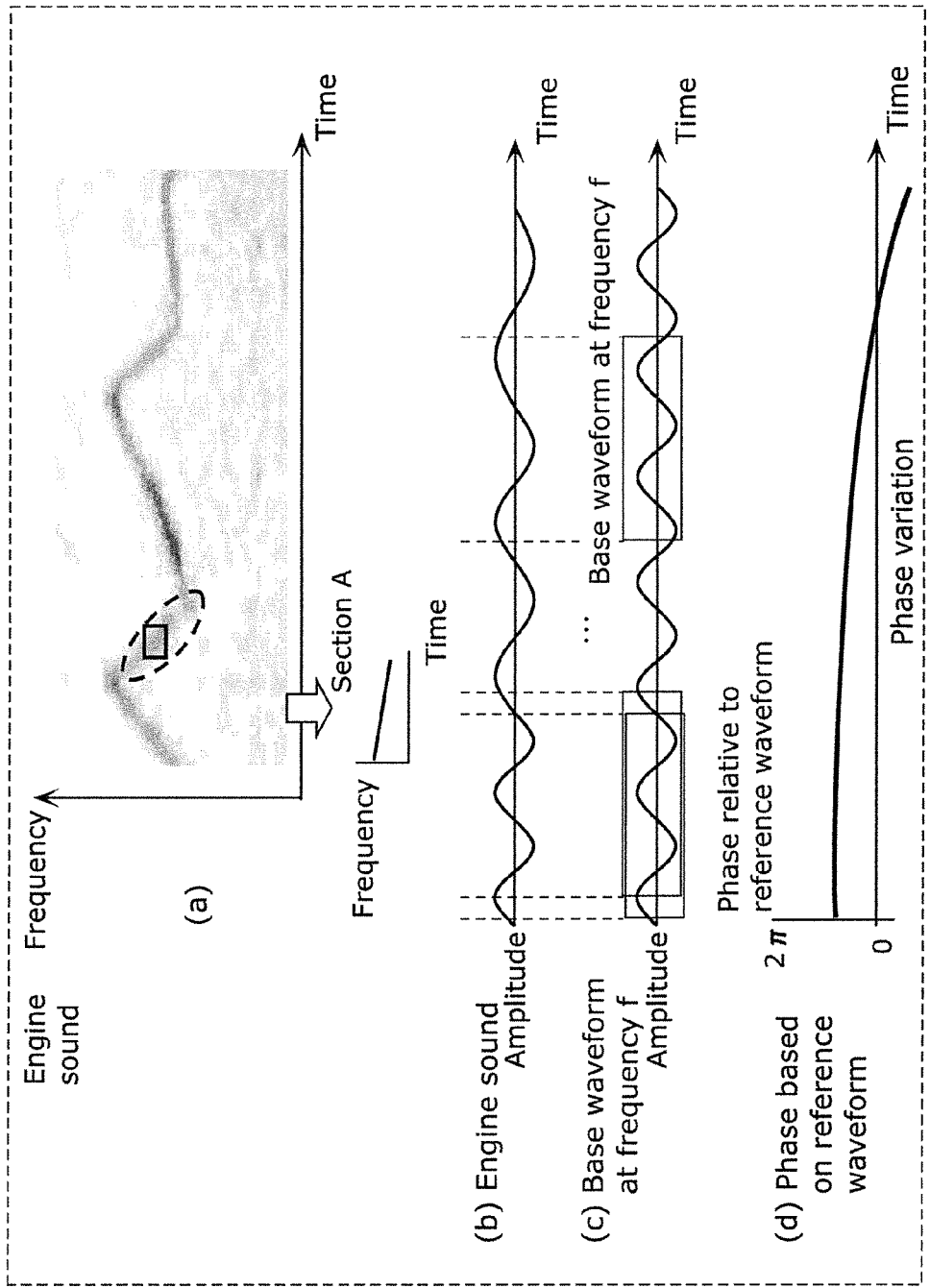
FIG. 10 is a diagram illustrating a phase of an engine sound when a vehicle decelerates due to a decrease in RPM.

(a) of FIG. 10 is a diagram showing only the section A of the spectrogram shown by FIG. 7. (b) of FIG. 10 is a diagram schematically showing a waveform of an engine sound when a vehicle is decelerating due to a decrease in RPM, in the section A shown by FIG. 7. Here, a frequency of the engine sound decreases with time. (c) of FIG. 10 is a diagram showing a base waveform. For example, a frequency of the base waveform is represented by f. (d) of FIG. 10 is a graph showing a phase of the engine sound relative to the base waveform. Since the engine sound has periodicity like the sine wave, and a waveform whose cycle becomes longer gradually ((b) of FIG. 10), as shown by (d) of FIG. 10, the phase of the engine sound relative to the base waveform decreases at an accelerating rate with respect to a time change.

Thus, as shown by (d) of FIGS. 8, 9, and 10, it is possible to determine the increase and decrease in RPM, that is, the acceleration and deceleration of each vehicle by calculating a phase variation at an accelerating rate with respect to the time change, using the phase of the engine sound relative to the base waveform. In addition, it is possible to accurately determine the number of vehicles based on a difference between the variations (i.e., uniformity of the acceleration and deceleration of the vehicles), by using the acceleration and deceleration of the vehicle.

Moreover, in this embodiment, it is possible to accurately determine the number of vehicles which cannot be accurately determined based on spectral power, by using a property that the phase significantly varies in a short time.

Furthermore, even when vehicle sounds are detected only instantaneously due to noises in the actual environment, it is possible to instantly determine the number of vehicles, using data obtained in the short time. Thus, it is possible to notify the driver of the accurate number of nearby vehicles in the short time.

In view of the above, the phase curve calculation unit 104 shown by FIG. 1 calculates, using a phase (represented by $\psi'(t)$) of a frequency signal of the vehicle sound candidate selected by the vehicle sound candidate selection unit 103, a phase shape (i.e., the shape of a phase curve) of which the phase varies with time. In other words, since the vehicle sound candidate selection unit 103 performs a threshold value process, that is, selects a vehicle sound (a vehicle sound candidate), assuming that the vehicle sound is in a predetermined frequency band and at a predetermined time where and when sound pressure is greater than or equal to a threshold value, the phase curve calculation unit 104 calculates the shape of the phase curve corresponding to the selected vehicle sound in the frequency band and at the time. In addition, in this embodiment, the phase curve calculation unit 104 calculates the phase curve indicating the variation with time as a quadratic curve (a quadratic approximate curve), for example.

The following describes processing performed by the phase curve calculation unit 104 on the frequency band (i.e., the vehicle sound candidate) selected in the threshold value process performed by the vehicle sound candidate selection unit 103. In addition, here, the description is based on an example where the center frequency of the frequency band and the frequency of a base waveform match. To put it differently, it is determined whether or not a frequency f having a phase (here, a corrected phase $\psi'(t)$ (=mod $2\pi\psi(t)-2\pi ft$)) increases relative to an analysis frequency f (the frequency of the base waveform). It is to be noted that in this embodiment, the frequency analysis unit 102 regards the base waveform shown by FIG. 5 as an analysis frequency that is not shifted along the temporal axis, and uses the corrected phase $\psi'(t)$ (=mod $2\pi\psi(t)-2\pi ft$)) to obtain a phase.

Figure 11:
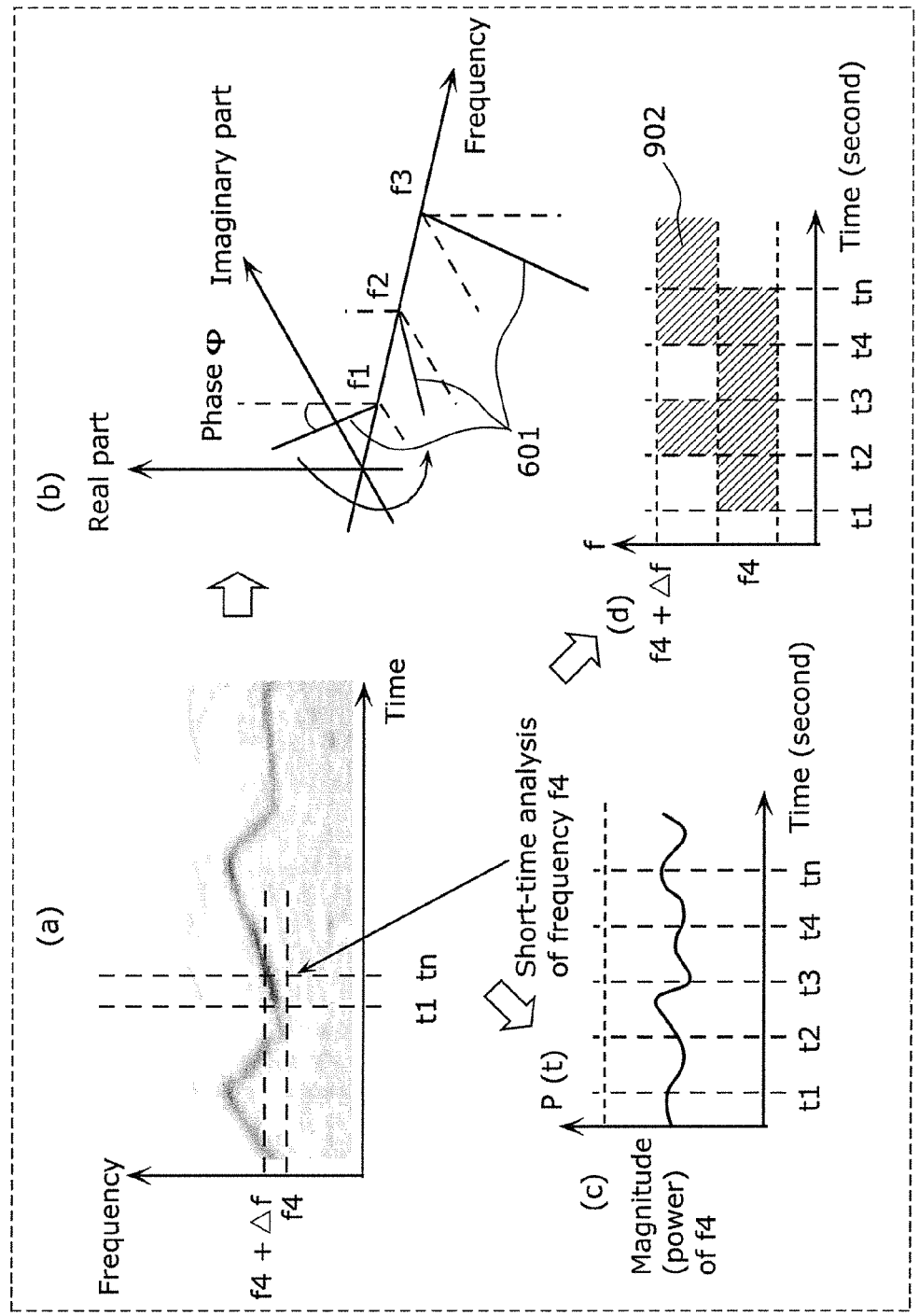
FIG. 11 is a graph illustrating sound pressure of a vehicle sound.

FIG. 11 is a diagram illustrating power and a phase in a frequency analysis for a surrounding sound (here, an engine sound). Like FIG. 7, (a) of FIG. 11 is a spectrogram resulting from a Discrete Fourier Transform (DFT) analysis performed on the engine sound of the vehicle.

(b) of FIG. 11 is a graph showing a concept of the DFT analysis. The graph shows a frequency signal 601 in a complex space, using a predetermined window function (the Hann window) having a predetermined time window width which starts from a time t1 and is, for instance, a time period during which the vehicle is accelerating due to the increase in RPM. The graph also shows the amplitude and the phase of each of frequencies such as frequencies f1, f2, f3, and so on. The length of the frequency signal 601 indicates magnitude (power) of the amplitude, and an angle between the frequency signal 601 and the real axis indicates the phase. A frequency signal at each of times is calculated while time shift is being performed. Here, in general, a spectrogram only shows the power of each frequency at each time, and omits the phase. Likewise, the spectrogram shown by each of FIG. 7 and (a) of FIG. 11 shows only the magnitude of power resulting from the DFT analysis.

A real part and an imaginary part of the frequency signal are expressed as x(t) and y(t), respectively. A phase $\psi(t)$ and magnitude (power) P(t) of the frequency signal are expressed respectively as below.

[Math. 1]

$$\psi(t) = \text{mod } 2\pi(\arctan(y(t)/x(t))) \quad \text{(Equation 1)}$$

and

[Math. 2]

$$P(t) = \sqrt{x(t)^2 + y(t)^2} \quad \text{(Equation 2)}$$

Here, the symbol t represents a time in the frequency signal.

Figure 13:
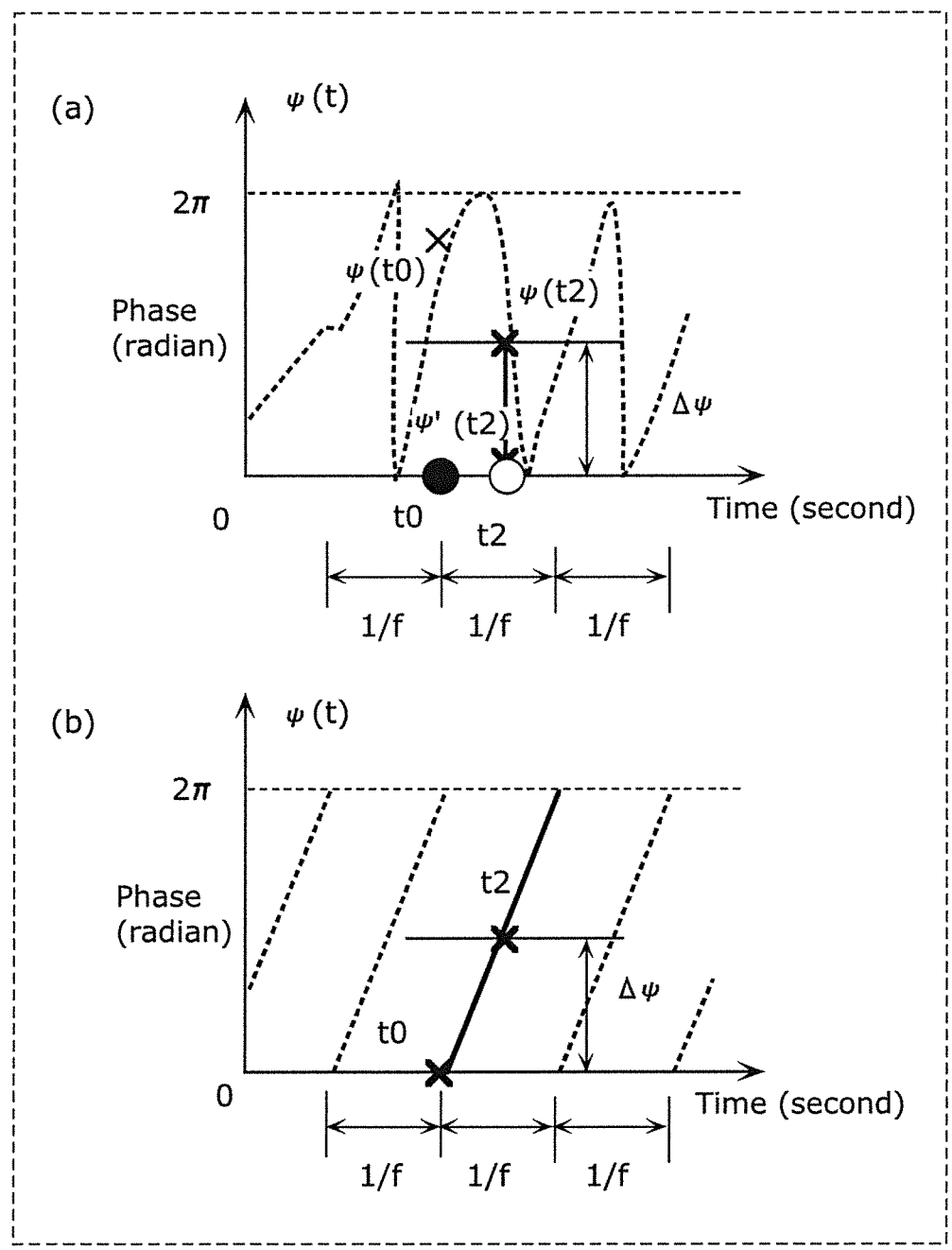
FIG. 13 is a graph illustrating a method of calculating a phase curve.

(c) of FIG. 11 shows a time dependency of power of the frequency (e.g., the frequency f4) in a period (t1 to tn) during which the vehicle is accelerating due to the increase in RPM shown by (a) of FIG. 13. Here, the horizontal axis is a temporal axis, and the vertical axis represents magnitude (power) of a frequency signal. (c) of FIG. 11 shows that the power varies randomly, and neither increases nor decreases. As shown by (c) of FIG. 11, in general, a spectrogram omits phase information, and shows a variation of a signal, based only on power. For this reason, to observe a variation of sound pressure of the engine sound, a sound signal is required which is sufficiently long (a few seconds). Furthermore, when a noise such as a noise of the wind is included, the loss of the variation of the sound pressure in the noise makes the observation difficult. As a result, it has been difficult to apply the conventional technique to an application such as safe driving support that is required to instantly determine the number of vehicles based only on information about the power, and notify a driver of the determined number of the vehicles in a short time.

(d) of FIG. 11 shows a time dependency of power of a sound between predetermined frequencies in the period during which the vehicle is accelerating due to the increase in RPM (assuming that the RPM are increasing from f4 to (f4+Δf)) shown by (a) of FIG. 11. The horizontal axis is a temporal axis. The vertical axis is a frequency axis. In (d) of FIG. 11, a part 902 that is hatched is shown as a period in which certain power is present. (d) of FIG. 11 shows that the frequency varies randomly, and the RPM neither increase nor decrease. As shown by (d) of FIG. 11, in general, the spectrogram omits the phase information, and shows the variation of the signal, based only on the power. As a result, to observe the variation of the frequency of the engine sound, a sound signal is required which is sufficiently long (a few seconds). Furthermore, when the noise such as the noise of the wind is included, the loss of the frequency variation in the noise makes the observation difficult.

In view of the above, in this embodiment, the vehicle count determination unit 105 focuses on phases of engine sounds, classifies, for each vehicle, the phases (i.e., phase curves) into at least one group based on time dependencies of phases (i.e., the shapes of the phase curves), and determines the number of vehicles.

A relationship between the increase and decrease in RPM and the time dependency of the phase can be expressed by the following equation.

[Math. 3]

$$\psi(t)=2\pi\int f(t)dt \quad \text{(Equation 3)}$$

As shown by FIG. 7 and so on, the variation of the frequency of the engine sound seldom varies randomly and is seldom discrete. The frequency clearly fluctuates in a predetermined manner at predetermined time intervals. Thus, the fluctuations are approximated, for instance, in a piecewise-linear manner as shown by following Equation 4.

[Math. 4]

$$f(t)=At+f_0 \quad \text{(Equation 4)}$$

Specifically, in a predetermined time period, the frequency f(t) at the time t can be linearly approximated using a line segment which increases or decreases from an initial value $f_0$ in proportion to the time t (a proportionality coefficient A).

When the frequency f(t) is expressed by Equation 4, the phase ψ(t) at the time t is expressed as follows.

[Math. 5]

$$\psi(t)=2\pi\int f(t)dt=2\pi\int(At+f_0)dt=\pi At^2+2\pi f_0 t+\psi_0 \quad \text{(Equation 5)}$$

Here, $\psi_0$ in the third term on the right-hand side represents an initial phase, and the second term ($2\pi f_0 t$) indicates that a phase is advanced by an angular frequency $2\pi f_0 t$ in proportion to the time t. The first term ($\pi At^2$) indicates that the phase can be approximated by a quadratic curve. Thus, in this embodiment, the phase curve calculation unit 104 calculates, for each vehicle sound candidate selected by the vehicle sound candidate selection unit 103, a quadratic curve as a phase curve by approximation, based on a phase of a signal at each time period, which indicates the vehicle sound candidate.

The following describes a method of calculating a corrected phase from a phase (a phase before correction) calculated while a base waveform is being shifted on a temporal axis.

It is to be noted that when the phase is calculated while the base waveform is being shifted on the temporal axis, as shown by (c) and (d) of FIG. 2, it is necessary to convert the phase ψ(t) into the phase ψ'(t)=mode 2π(ψ(t)−2πft) (where f represents an analysis frequency), to perform phase correction. Hereinafter, the details are described.

Figure 12:
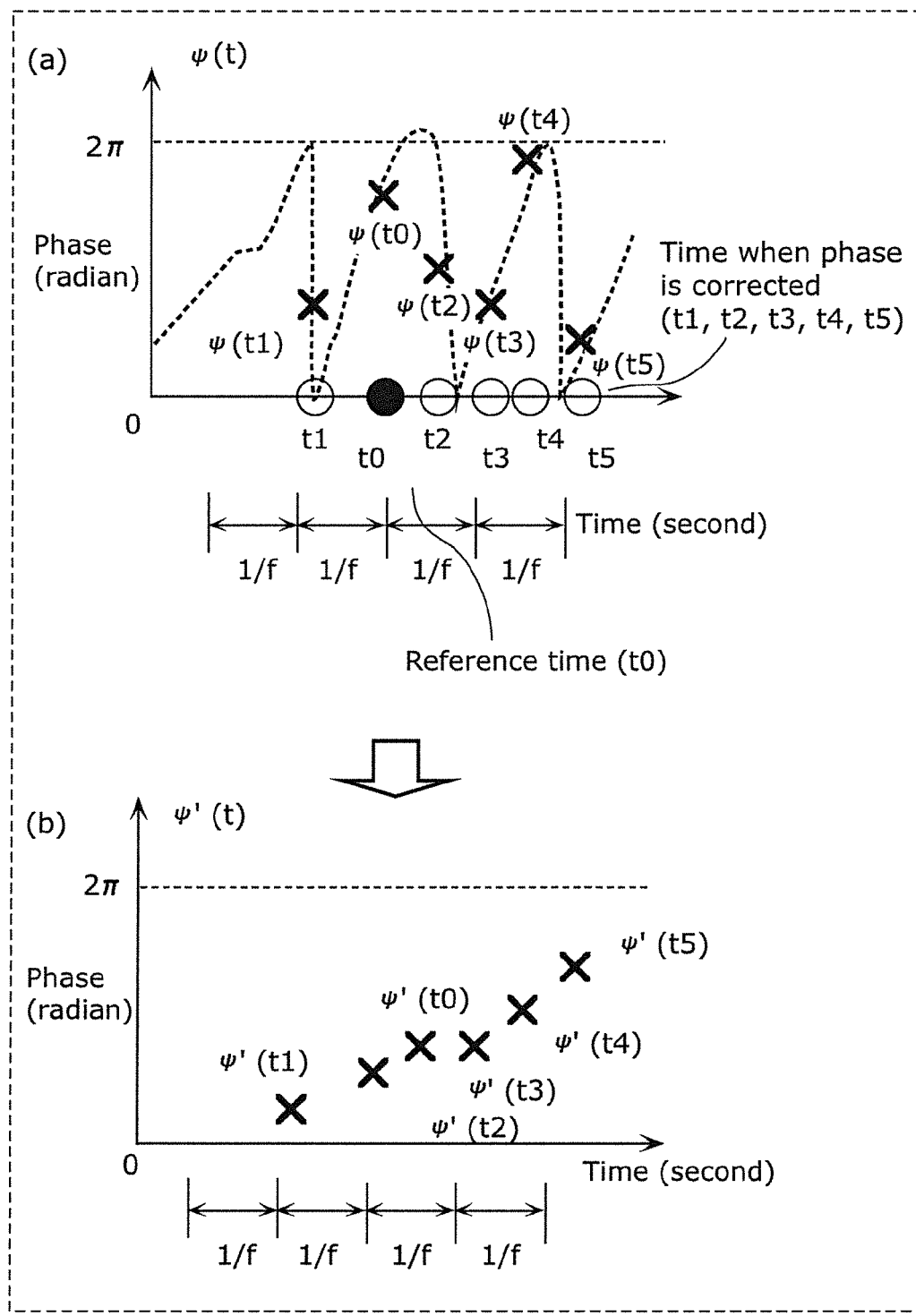
FIG. 12 is a graph illustrating a method of calculating a phase curve.

First, a reference time is determined. (a) of FIG. 12 is a diagram showing a phase in a predetermined time period from a time t1 shown in (a) of FIG. 9. A time t0 indicated by a black circle in (a) of FIG. 12 is determined as the reference time.

Next, the phase curve calculation unit 104 determines times in frequency signals for which phases are corrected. In this example, times (t1, t2, t3, t4, and t5) indicated by five white circles in (a) of FIG. 12 are determined as the times in the frequency signals for which the phases are corrected.

Here, a phase of a frequency signal at the reference time t0 is expressed as follows.

[Math. 6]

$$\psi(t_0)=\text{mod } 2\pi(\arctan(y(t_0)/x(t_0))) \quad \text{(Equation 6)}$$

A phase of a frequency signal at each of the five times when the phases are corrected is expressed as follows.

[Math. 7]

$$\psi(t_i)=\text{mod } 2\pi(\arctan(y(t_i)/x(t_i)))(i=1,2,3,4,5) \quad \text{(Equation 7)}$$

Each of the phases before correction is indicated by a cross mark in (a) of FIG. 12. In addition, magnitude of each of the frequency signals corresponding to the times is expressed as follows.

[Math. 8]

$$P(t_i)=\sqrt{x(t_i)^2+y(t_i)^2} \quad (i=1,2,3,4,5) \quad \text{(Equation 8)}$$

Next, FIG. 13 shows a method of correcting a phase of a frequency signal at the time t2. (a) of FIG. 13 is the same as (a) of FIG. 12. In (b) of FIG. 13, a solid line shows a phase that regularly varies up to 0 to 2n (radian) at time intervals of 1/f (where f is an analysis frequency) and an equiangular velocity. Here, the corrected phase is expressed as follows.

[Math. 9]

$$\psi'(t_i)(i=0,1,2,3,4,5)$$

In (b) of FIG. 13, when the phases at the reference time t0 and the time t2 are compared, the phase at the time t2 is greater than the phase at the reference time t0 by an amount calculated as below.

[Math. 10]

$$\Delta\psi=2\pi f(t_2-t_0) \quad \text{(Equation 9)}$$

In view of the above, in (a) of FIG. 13, to correct a phase difference resulting from a time difference from the phase ψ(t0) at the reference time t0, ψ'(t2) is calculated by subtracting Δψ from the phase ψ(t2) at the time t2. ψ'(t2) represents the corrected phase at the time t2. Here, since the phase at the time t0 is the phase at the reference time, the phase at the time t0 has the same value even after being corrected. Specifically, the corrected phase is calculated as below.

[Math. 11]

$$\psi'(t_0)=\psi(t_0) \quad \text{(Equation 10)}$$

[Math. 12]

$$\psi'(t_i)=\mathrm{mod}\, 2\pi(\psi(t_i)-2\pi f(t_i-t_0))(i=1,2,3,4,5) \quad \text{(Equation 11)}$$

In (b) of FIG. 12, cross marks indicate the corrected phases of the frequency signals. A display method for use in (b) of FIG. 12 is the same as in (a) of FIG. 12, and thus a description thereof is omitted. It is to be noted that when a phase is calculated while a base waveform is not being shifted on the temporal axis, the corrected phase is directly obtained.

The phase curve calculation unit 104 calculates a time dependencies of phases (corrected phases) as a curve (a phase curve that is a quadratic curve). First, the phase curve calculation unit 104 selects frequency signals to be used for calculating a phase shape. Assuming that a time when an analysis is performed is represented by t0, the phase curve calculation unit 104 calculates the phase shape from phases of frequency signals at the times t0 to t5. Here, the frequency signals used for calculating the phase curve are greater than or equal to a predetermined value in number (in this example, the six frequency signals at the times t0 to t5). This is because it is possible to avoid the difficulty in determining the regularity of the time dependencies of the phases when the number of frequency signals selected for calculating a phase distance is small. Predetermined duration may be determined based on the characteristics of a time dependency of a phase in an engine sound. An analysis section may be changed depending on an area where a vehicle is present. For example, the analysis section is reduced, because a phase variation is rapid in a narrow street area or an intersection area where a vehicle often accelerates or decelerates, and the analysis section is extended for an area where the vehicle moves at a relatively constant speed. In addition, the analysis section may be changed depending on a frequency band to be analyzed. The analysis section suitable for the frequency band may be used appropriately. For instance, the analysis section is extended in the case of a low frequency such as 200 Hz or less, and the analysis section is reduced for a relatively high frequency band such as 200 Hz or greater.

The phase curve calculation unit 104 calculates, by approximation, the phase curve from the phases of the selected frequency signals. The phase curve is approximated according to, for example, the following quadratic polynomial (Equation 12 below).

[Math. 13]

$$\Psi(t)=A_2 t^2+A_1 t+A_0 \quad \text{(Equation 12)}$$

FIG. 14 is a diagram illustrating a method of calculating a phase curve, which is performed by the phase curve calculation unit 104. As shown by FIG. 14, the phase curve calculation unit 104 calculates a quadratic curve based on a predetermined number of points. In this embodiment, the phase curve calculation unit 104 calculates the quadratic curve as a multiple regression curve. Specifically, assuming that a corrected phase at a time $t_i$ (where i=0, 1, 2, 3, 4, or 5) is represented by $\psi'f(t_i)$, the phase curve calculation unit 104 calculates each of coefficients $A_2$, $A_1$, and $A_0$ of the quadratic curve $\psi(t)$ as follows.

[Math. 14]

$$A_2 = \frac{S_{(t\times i,\psi)} \times S_{(t,i)} - S_{(t,\psi)} \times S_{(t,i\times t)}}{S_{(t,i)} \times S_{(t\times i,t\times i)} - S_{(i,i\times t)} \times S_{(i,t\times t)}} \quad \text{(Equation 13)}$$

[Math. 15]

$$A_1 = \frac{S_{(t,\psi)} \times S_{(t\times i,t\times i)} - S_{(t\times t,\psi)} \times S_{(i,i\times t)}}{S_{(t,i)} \times S_{(i\times t,i\times t)} - S_{(i,t\times i)} \times S_{(i,t\times i)}} \quad \text{(Equation 14)}$$

[Math. 16]

$$A_0 = \frac{\sum \psi'_i}{n} - A_1 \times \frac{\sum t_i}{n} - A_2 \times \frac{\sum (t_i)^2}{n} \quad \text{(Equation 15)}$$

It is to be noted that items on the right-hand side of respective Equations 13 and 14 are expressed as follows.

[Math. 17]

$$S_{(t,i)} = \sum (t_i \times t_i) - \frac{\sum t_i \times \sum t_i}{n} \quad \text{(Equation 16)}$$

[Math. 18]

$$S_{(i,\psi)} = \sum (t_i \times \psi'(t_i)) - \frac{\sum t_i \times \sum \psi'(t_i)}{n} \quad \text{(Equation 17)}$$

[Math. 19]

$$S_{(i,t\times t)} = \sum (t_i \times t_i \times t_i) - \frac{\sum t_i \times \sum (t_i \times t_i)}{n} \quad \text{(Equation 18)}$$

[Math. 20]

$$S_{(i\times t,\psi)} = \sum (t_i \times t_i \times \psi'(t_i)) - \frac{\sum (t_i \times t_i) \times \sum \psi'(t_i)}{n} \quad \text{(Equation 19)}$$

[Math. 21]

$$S_{(i\times t,i\times t)} = \sum (t_i \times t_i \times t_i \times t_i) - \frac{\sum (t_i \times t_i) \times \sum (t_i \times t_i)}{n} \quad \text{(Equation 20)}$$

The vehicle count determination unit 105 classifies, into at least one group, the phase curves that are the quadratic curves calculated by the phase curve calculation unit 104, based on the shapes of the phase curves (more specifically, by using a degree of similarity among the quadratic coefficients of the quadratic curves (the uniformity of signs)), and determines the number of the obtained groups as the number of vehicles.

Specifically, the vehicle count determination unit 105 distinguishes, by using the uniformity of convex directions of the phase curves calculated by the phase curve calculation unit 104, vehicles, to accurately determine the number of the vehicles. When the coefficient $A_2$ calculated according to Equation 12 is positive, that is, a phase curve is convex downward, the vehicle is considered to be accelerating due to the increase in RPM. In contrast, when the coefficient $A_2$ is negative, that is, a phase curve is convex upward, the vehicle is considered to be decelerating due to the decrease in RPM. Suppose that two engine sounds (i.e., two streaks (peaks) at different frequencies) are detected and that convex directions of phase curves differ from each other for the two engine sounds, the vehicle count determination unit 105 recognizes the two engine sounds as being emanated from different vehicles, and determines that two vehicles have been present. On the other hand, suppose that the convex directions of the phase curves are identical to each other for the two engine sounds, the vehicle count determination unit 105 recognizes the two engine sounds as being emanated from the same vehicle, and determines that one vehicle has been present. As stated above, the vehicle count determination unit 105 classifies, into the at least one group, the phase curves that are the quadratic curves calculated by the phase curve calculation unit 104, using the degree of similarity among the quadratic coefficients of the quadratic curves (the uniformity of signs), and determines the number of the obtained groups as the number of the vehicles.

Figure 15:
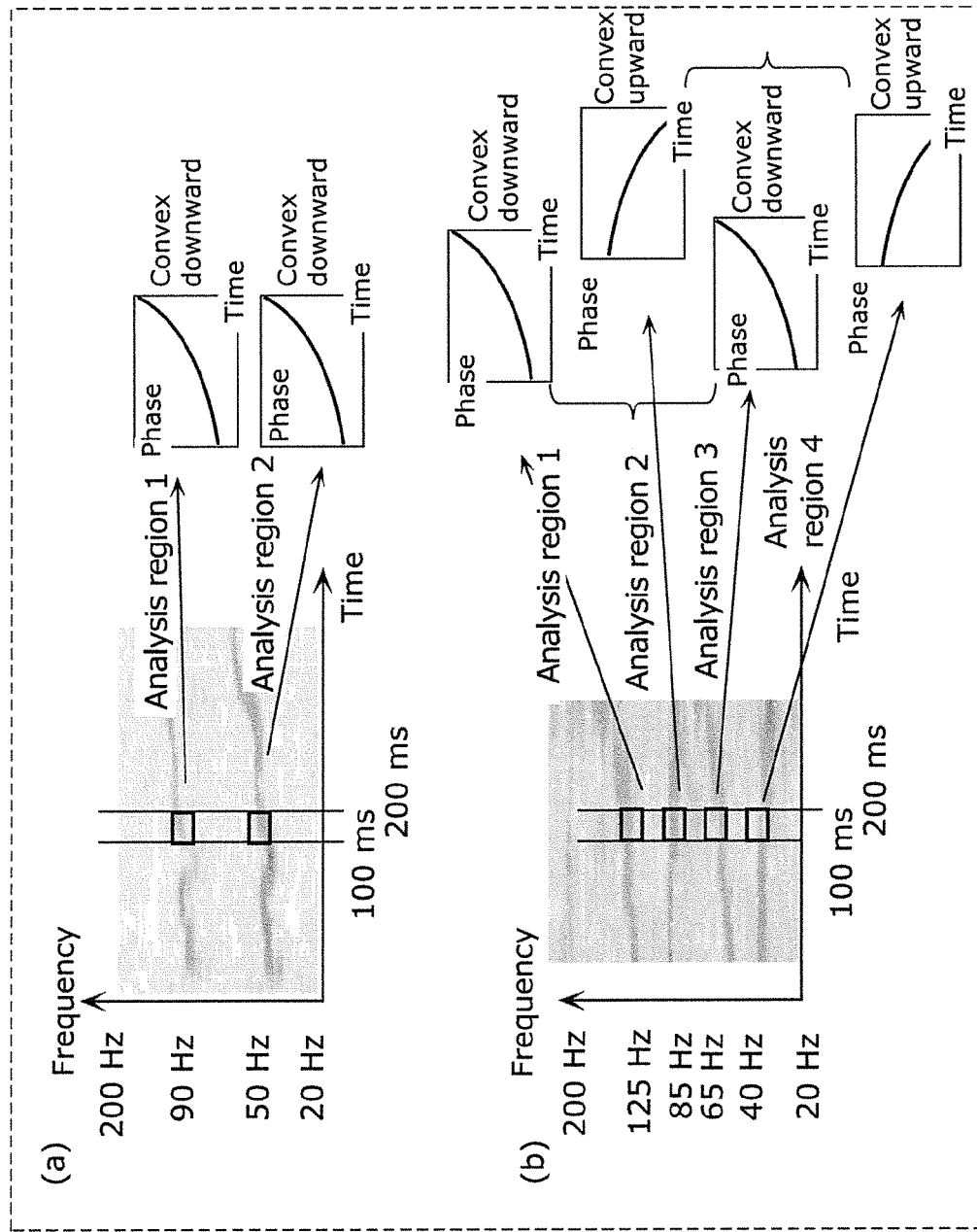
FIG. 15 is a graph illustrating a vehicle counting method.

FIG. 15 is a diagram illustrating a vehicle number determination method performed by the vehicle count determination unit 105. Similar to (a) of FIG. 4, (a) of FIG. 15 is a spectrogram for an actual vehicle sound detected by the vehicle sound detection microphone 101 when one vehicle is approaching. Here, although the one vehicle is present, the vehicle sound includes timbres, and thus the peaks of sound pressure greater than or equal to a threshold value are detected at two frequency bands of 90 Hz and 50 Hz. It is clear that the vehicle sound appears as two blackish streaks in the spectrogram. These two blackish streaks represent regions (vehicle sound candidates) selected by the vehicle sound candidate selection unit 103. The vehicle count determination unit 105 determines the number of vehicles based on such two blackish streaks, that is, shapes of phases of frequency signals in predetermined duration (here, for instance, 100 ms) which are predetermined frequency bands. In (a) of FIG. 15, rectangle regions outlined by black line are analysis sections (i.e., the regions selected by the vehicle sound candidate selection unit 103). An analysis region 1 is at the frequency of 90 Hz and has the duration of 100 ms between 100 ms and 200 ms, and an analysis region 2 is at the frequency of 50 Hz and has the duration of 100 ms between 100 ms and 200 ms. Respective phases in the analysis regions 1 and 2 are represented by phase curves indicated by directional lines. Stated differently, the shapes of the phases curves are calculated as showing convex downward for both the analysis regions 1 and 2. In such a case, since the shapes of the phase in both the analysis regions 1 and 2 are similar to each other as showing convex downward, the vehicle count determination unit 105 regards the two streaks (peaks) corresponding to the respective analysis regions 1 and 2 as an engine sound emanated from one vehicle, and determines that the one vehicle has been present. On the other hand, in the case of two vehicles, the vehicle count determination unit 105 determines two as the number of the vehicles, because shapes of phase curves are different from each other.

In contrast, similar to (b) of FIG. 4, (b) of FIG. 15 is a spectrogram for actual vehicle sounds detected by the vehicle sound detection microphone 101 when two vehicles are approaching. The peaks of sound pressure greater than or equal to a threshold value are detected at four frequency bands of 125 Hz, 85 Hz, 65 Hz, and 40 Hz. It is clear that the vehicle sounds appear as four blackish streaks in the spectrogram. These four blackish streaks represent regions (vehicle sound candidates) selected by the vehicle sound candidate selection unit 103.

An analysis region 1 is at the frequency of 125 Hz and has the duration of 100 ms between 100 ms and 200 ms, an analysis region 2 is at the frequency of 85 Hz and has the duration of 100 ms between 100 ms and 200 ms, an analysis region 3 is at the frequency of 65 Hz and has the duration of 100 ms between 100 ms and 200 ms, and an analysis region 4 is at the frequency of 40 Hz and has the duration of 100 ms between 100 ms and 200 ms. (To put it differently, the analysis regions 1 to 4 are regions selected by the vehicle sound candidate selection unit 103.) Respective phases in the analysis regions 1 to 4 are represented by phase curves indicated by directional lines. The phase curves are convex downward in the analysis regions 1 and 3, and the vehicle count determination unit 105 classifies the two streaks (peaks) corresponding to the analysis regions 1 and 3 as one vehicle. In addition, the phase curves are convex upward in the analysis regions 2 and 4, and the vehicle count determination unit 105 classifies the two streaks (peaks) corresponding to the analysis regions 2 and 4 as another vehicle. Thus, the vehicle count determination unit 105 determines that the two vehicles in total have been present.

The notification unit 106 is, for example, a display control unit or a display unit which notifies the driver of the number of the vehicles determined by the vehicle count determination unit 105. In addition, the notification unit 106 controls a notification mode depending on the number of the vehicles. For instance, when the vehicle counting device is included in a car navigation system or the like, an output mode is set to sound, and the notification unit 106 gives an audio alert about the approach of vehicle and the number of vehicles.

Figure 16:
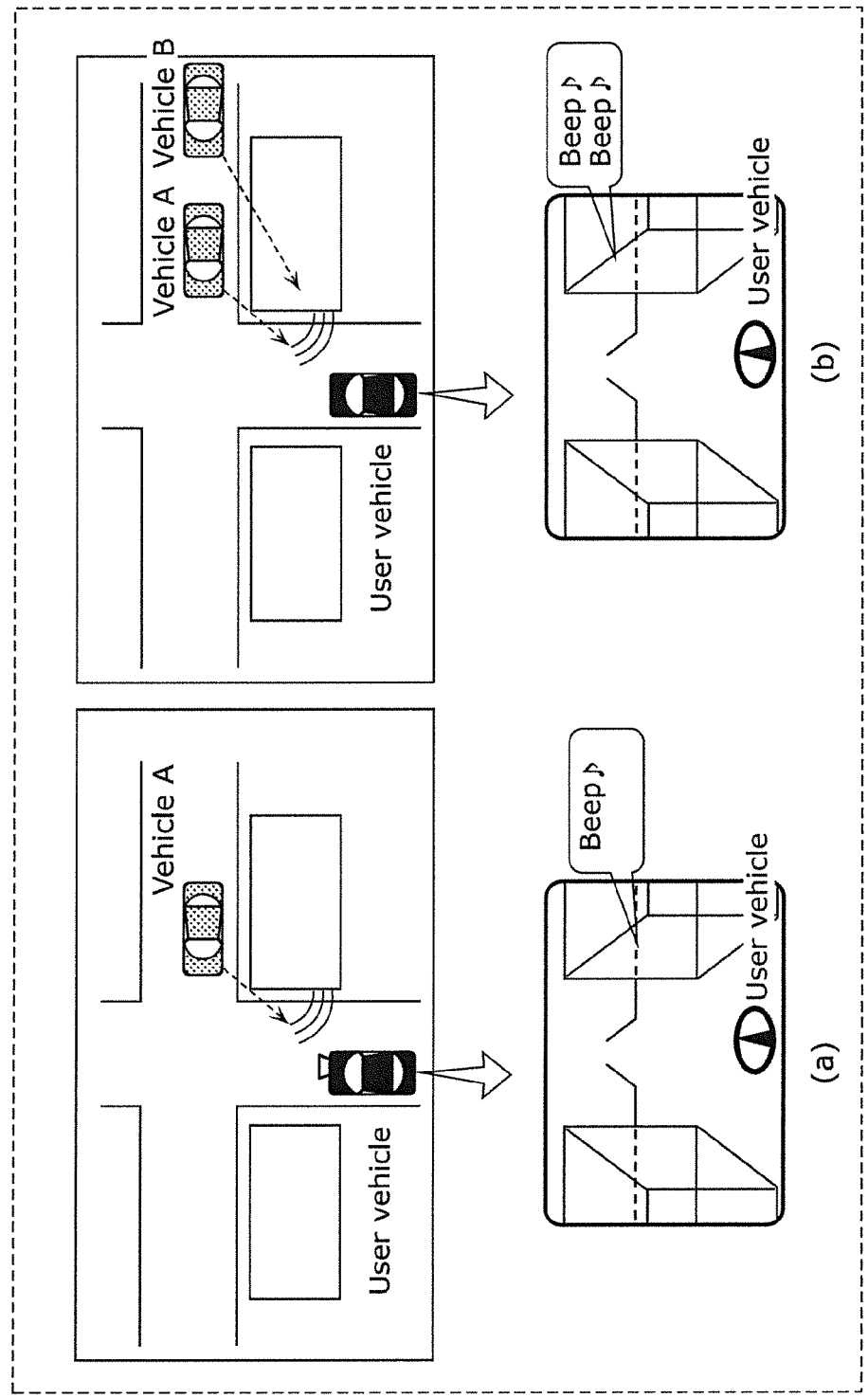
FIG. 16 is a diagram illustrating vehicle notification modes.

FIG. 16 is a diagram illustrating an exemplary notification by the notification unit 106.

(a) of FIG. 16 is a diagram showing a situation where one vehicle is approaching, from the right side, a user vehicle that is nearing an intersection. Here, it is assumed that the vehicle count determination unit 105 determined that the one vehicle had been present. The notification unit 106 notifies by a "beep" the driver of the one approaching vehicle.

(b) of FIG. 16 is a diagram showing a situation where two vehicles are approaching, from the right side, a user vehicle that is nearing an intersection. Here, it is assumed that the vehicle count determination unit 105 determined that the two vehicles had been present. The notification unit 106 notifies by "beep, beep" the driver of the two approaching vehicles.

When the approach of vehicle is notified, it is necessary to notify the driver as quickly and simply as possible. The notification by the "beep" by the notification unit 106 produces an effect of urging the driver to drive safely. Moreover, the mere notification of the approach of vehicle does not allow the driver to know whether one or more vehicles are approaching, and the driver gets confused accordingly. In view of the above, when the one vehicle is determined to be present, the notification unit 106 beeps once, and when the two vehicles are determined to be present, the notification unit 106 beeps twice, thereby notifying the driver of the difference. In other words, the notification unit 106 notifies the driver in a different mode depending on whether the vehicle count determination unit 105 determines that the one vehicle has been present or determines that the two vehicles have been present.

It is to be noted that the cases where the one nearby vehicle is present and where the two nearby vehicles are present are described as the example in this embodiment, the present disclosure is not limited to the cases. When plural vehicles such as three vehicles are present, the notification unit 106 may beep as many times as the number of the vehicles.

Furthermore, when two or more vehicles such as three vehicles are present, the notification unit 106 may notify that the plural vehicles are present, by beeping twice, for instance, as in the case where the two vehicles are present, instead of as many times as the number of the vehicles, and may switch between notifications depending on whether the one or more vehicles are determined to be present. Even notifying the driver of whether the one or more vehicles are determined to be present often leads to assistance in making a decision by the driver. The driver can make a decision such as a decision to enter the intersection immediately after the one vehicle passes, when the only one vehicle is determined to be present, and a decision to wait when the plural vehicles are determined to be present, whether the number of the plural vehicles is two or three. A procedure described in this embodiment may be used to distinguish whether the one or more vehicles are determined to be present, and the notification unit 106 may switch between the notification modes. Moreover, although the output mode is described as being set to the sound in this embodiment, the notification unit 106 in this embodiment is not limited to use the sound. When notifying the presence of vehicle visually, the notification unit 106 may display as many symbols of vehicles as the number of vehicles.

As stated above, the notification unit 106 may change control depending on whether the one or more vehicles are determined to be present. It may be important for the driver to know whether the one or more vehicles are determined to be present, depending on a driving situation. For instance, suppose that the driver would like to know the presence of approaching vehicle at the intersection, when one vehicle is determined to be present, the user vehicle can enter the intersection after the one vehicle passes, but when plural vehicles are determined to be present, the user vehicle needs to wait whether the number of the plural vehicles is two or three. Here, the notification modes may be switched between depending on whether the one or more vehicles are determined to be present.

Figure 17:
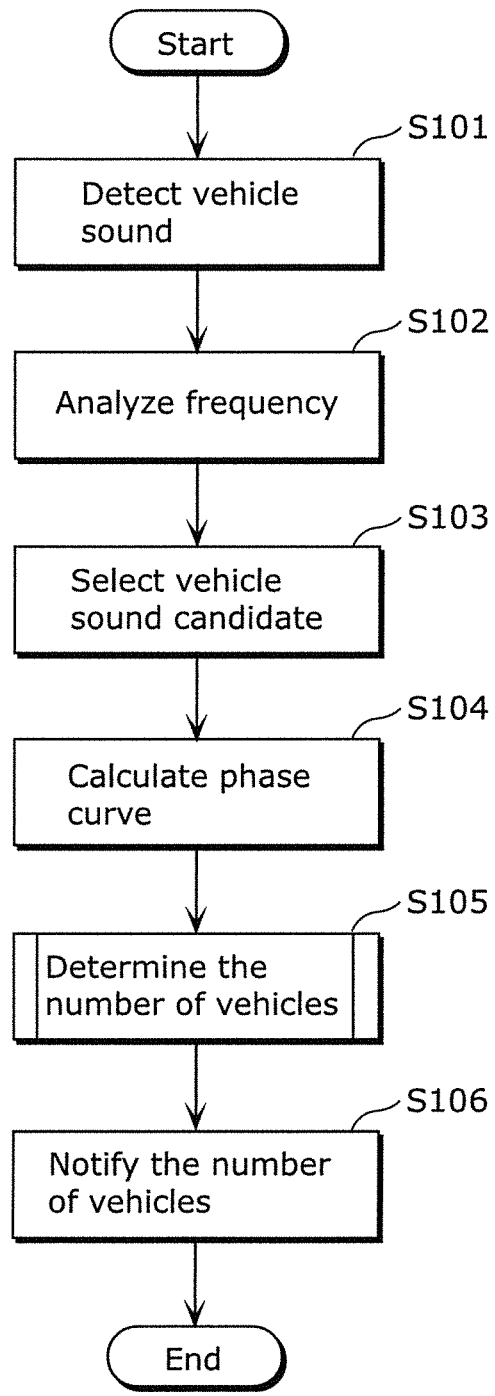
FIG. 17 is a flow chart showing operations of the vehicle counting device according to Embodiment 1.
Figure 18:
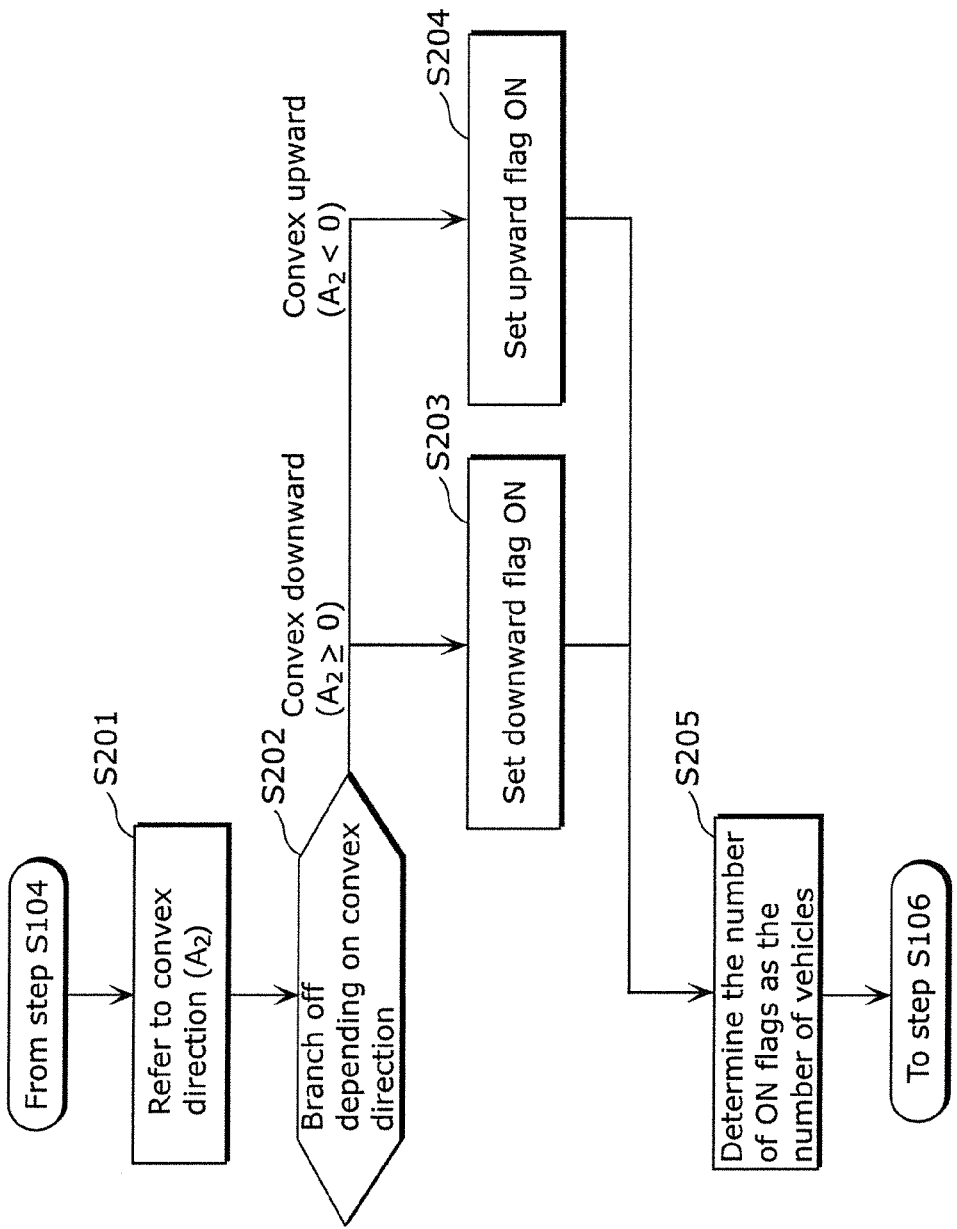
FIG. 18 is a flow chart showing details of step S105 shown by FIG. 17.

The following describes an operation flow of the vehicle counting device 100 according to this embodiment with reference to flow charts shown by FIGS. 17 and 18. FIG. 17 is a flow chart showing operations of the vehicle counting device 100 according to this embodiment. FIG. 18 is a flow chart showing details of step S105 shown by FIG. 17.

First, the vehicle sound detection microphone 101 detects one or more vehicle sounds (step S101). Next, the frequency analysis unit 102 performs a frequency analysis on a surrounding sound (step S102).

Then, the vehicle sound candidate selection unit 103 selects, from the surrounding sound on which the frequency analysis is performed, predetermined frequency bands and time periods as vehicle sound candidates (step S103). For example, the vehicle sound candidate selection unit 103 sets a threshold value for sound pressure, and selects frequency bands and time periods greater than or equal to the predetermined threshold value as vehicle sound candidates. Next, the phase curve calculation unit 104 calculates, as a phase curve, a phase shape in each of the selected periods (vehicle sound candidates) which varies with time (step S104). In other words, the phase curve calculation unit 104 calculates the phase curve from a phase (corrected phase) in each of the periods (vehicle sound candidates) selected by the vehicle sound candidate selection unit 103, according to Equations 13 to 15.

Then, the vehicle count determination unit 105 determines the number of vehicles based on the calculated phase curves (step S105).

FIG. 18 is a detailed flow of number of vehicles determination (step S105) by the vehicle count determination unit 105. First, the vehicle count determination unit 105 refers to a convex direction of each phase curve (step S201), and branches off the processing depending on the convex direction (step S202). To put it differently, when the phase curve projects upward (is convex upward), the vehicle count determination unit 105 sets an upward flag on (step S203). Specifically, the vehicle count determination unit 105 refers to a positive or negative sign of the coefficient $A_2$ in Equation 13.

In contrast, when the phase curve projects downward (is convex downward), the vehicle count determination unit 105 sets a downward flag on (step S204). Finally, the vehicle count determination unit 105 calculates the number of vehicles by referring to the number of flags (step S205). As above, the vehicle count determination unit 105 determines the number of the vehicles by using the degree of similarity among the quadratic coefficients of the phase curves that are the quadratic curves calculated by the phase curve calculation unit 104.

Figure 19:
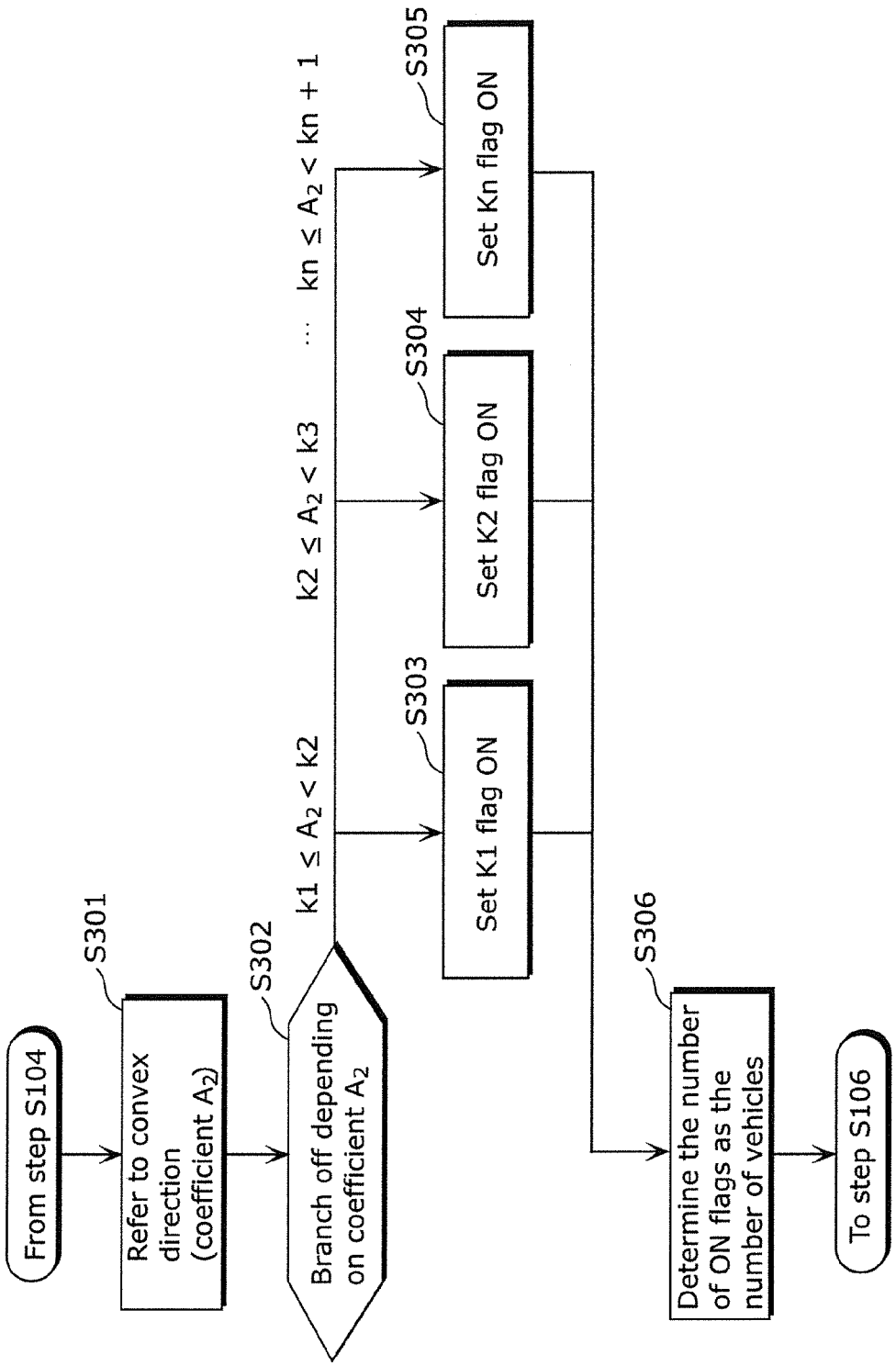
FIG. 19 is a flow chart showing other details of step S105 shown by FIG. 17.

It is to be noted that the binarization process (the steps S202 to S204) is performed in this embodiment, a vehicle counting method is not limited to this. For example, as in another detailed flow of the step S105 shown by FIG. 19, the vehicle count determination unit 105 may classify the shapes of the phase curves into three or more groups, based on the coefficients $A_2$ and predetermined difference threshold values (k1, k2), and determine the number of the vehicles (steps S601 to S606). For instance, it is also possible to classify shapes of phase curves, of which a phase curve has the coefficient $A_2$ indicating 2 (convex downward), another phase curve has the coefficient $A_2$ indicating 1 (convex downward, but representing another vehicle), and a still another phase curve has the coefficient $A_2$ indicating −1 (convex upward), into groups depending on the number of the vehicles such as three.

Finally, the notification unit 106 notifies the determined number of the vehicles (step S106).

As described above, the vehicle counting device 100 according to this embodiment accurately determines the number of the vehicles based on the shapes of the phase curves corresponding to the vehicle sounds, that is, the properties unique to the vehicle sounds, and notifies the driver of the determined number of the vehicles, thereby supporting the safe driving. In addition, although, when the approach of vehicle is notified, it is necessary to notify the driver as quickly and simply as possible, the vehicle counting device 100 according to this embodiment determines the number of the vehicles based on the time dependencies of the phases, that is, determines the number of the vehicles in a short time such as several hundreds ms.

Moreover, the mere notification of the approach of vehicle as in the conventional technique does not allow the driver to know whether the one or more vehicles are approaching, and the driver gets confused accordingly. In contrast, the vehicle counting device 100 according to this embodiment determines the number of the vehicles based on the shapes of the phase curves unique to the vehicle sounds, and thus the vehicle counting device 100 is more effective when the plural vehicles are present and avoids a danger that the user vehicle enters the intersection mistakenly after the one vehicle passes.

As above, in this embodiment, the vehicle counting device 100 determines the number of the vehicles, using the shapes of the phase curves corresponding to the vehicle sounds at the same time. Specifically, as shown by (a) of FIG. 15, the vehicle counting device 100 refers to the convex directions of the phase curves corresponding to the vehicle sounds at the same time, determines the number of the vehicles by determining that the phase curves are similar to a phase curve corresponding to a vehicle sound emanated from one vehicle, when the convex directions are identical to each other, and determines the number of the vehicles by determining that the respective phase curves are similar to phase curves each corresponding to a vehicle sound emanated from a different vehicle, when the convex directions are different from each other. As a result, the vehicle counting device 100 determines the number of the vehicles after determining a degree of similarity among states of acceleration and deceleration by vehicles, and determines more accurately the number of the vehicles even in a complicated situation such as a situation where the plural vehicles are approaching.

It is to be noted that the vehicle counting method is not limited to the above. For instance, the number of vehicles may be determined by using shapes of phase curves, each of which has predetermined duration, within the predetermined duration.

Figure 20:
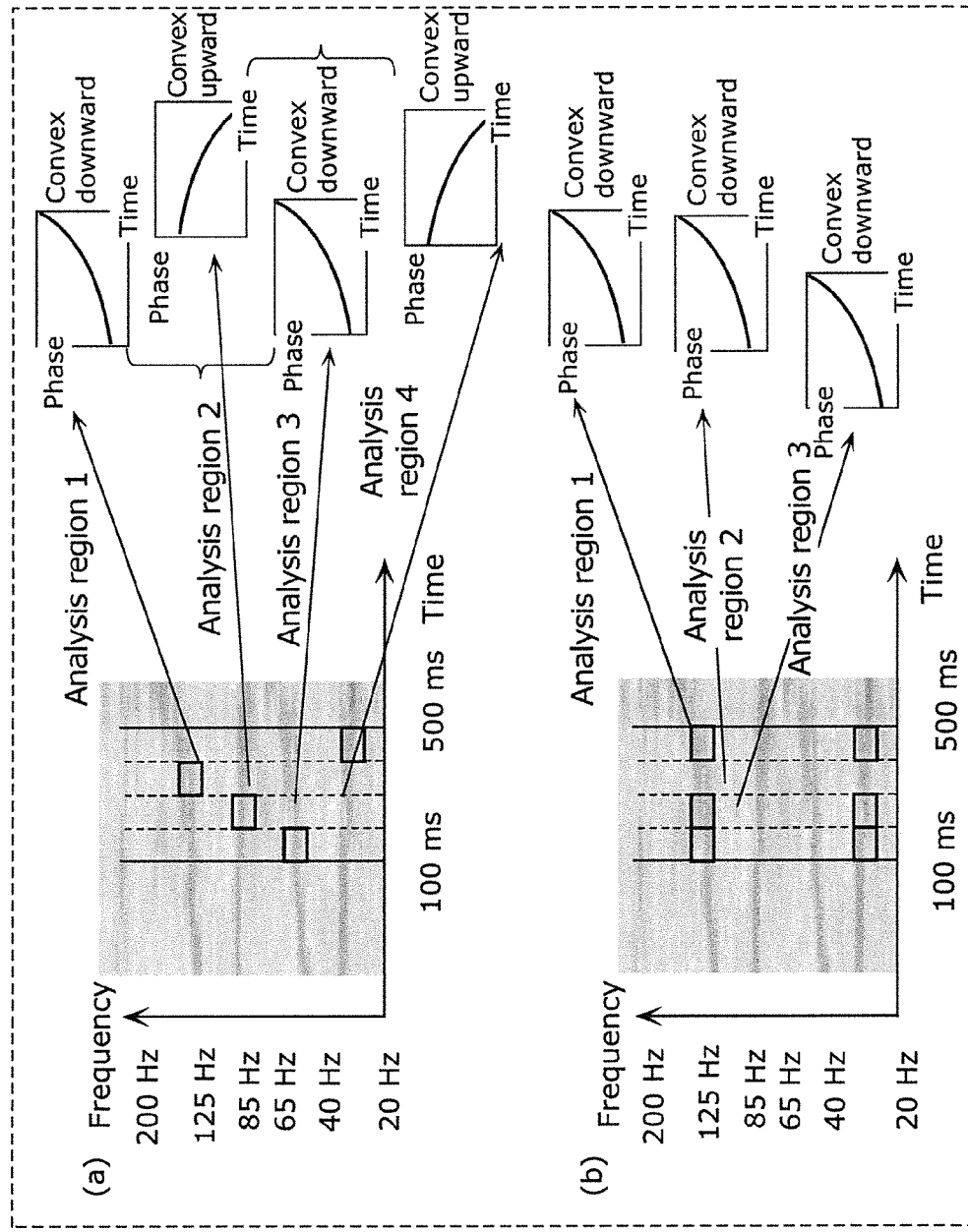
FIG. 20 is a graph illustrating a vehicle counting method.

FIG. 20 is a diagram illustrating a vehicle counting method performed by using shapes of phase curves within predetermined duration. (a) of FIG. 20 is the same spectrogram as shown by (b) of FIG. 15. The spectrogram is obtained when the two vehicles are moving, and the vehicle sounds greater than or equal to the threshold value appear as the four streaks. As shown by (b) of FIG. 15, in this embodiment, the number of the vehicles is determined based on the shapes of the phases at the same time. In the method shown by (a) of FIG. 20, the number of vehicles is determined not at the same time but within predetermined duration (here, within 400 ms between 100 ms and 500 ms). Specifically, an analysis region 1 has the duration of 100 ms between 300 ms and 400 ms, an analysis region 2 has the duration of 100 ms between 200 ms and 300 ms, an analysis region 3 has the duration of 100 ms between 100 ms and 200 ms, and an analysis region 4 has the duration of 100 ms between 400 ms and 500 ms, and a shape of a phase curve is calculated for each of the analysis regions 1 to 4. The number of the vehicles is determined using the shapes of the phase curves. Specifically, since the shapes of the phase curves are convex upward in the analysis regions 1 and 3 and the shapes of the phase curves are convex downward in the analysis regions 2 and 4, the number of the vehicles is determined as plural (two).

Generally speaking, a vehicle is less likely to frequently repeat acceleration and deceleration in a short time, and may keep accelerating or decelerating during a certain period of time. Thus, shapes of phases in the period of time are often similar to each other. In addition, an engine sound in the actual environment does not necessarily include sound pressure having a predetermined threshold value due to the influence of the surrounding noise or the like, and there is a case where all vehicle sounds cannot be detected at the same time. Thus, the number of the vehicles may be determined based not on the shapes of the phases at the same time but on the shapes of the phase curves with the predetermined duration. Consequently, it is possible to determine the number of the vehicles in a manner more suitable for the actual environment.

Moreover, the shapes of the phase curves may be determined using mutually different analysis regions in the same streak (peak) in the spectrogram. (b) of FIG. 20 is also the same spectrogram as shown by (a) of FIG. 20 or (b) of FIG. 15. The spectrogram is obtained when the two vehicles are moving, and the vehicle sounds greater than or equal to the threshold value appear as the four streaks. As shown by (b) of FIG. 15 and (a) of FIG. 20, in this embodiment and modifications thereof, the one vehicle is determined using the analysis regions at a certain time. Here, vehicles are distinguished using analysis regions during predetermined duration (within 400 ms between 100 ms and 500 ms). Specifically, an analysis region 1 is at the frequency of 125 Hz and has the duration of 100 ms between 100 ms and 200 ms, an analysis region 2 is at the frequency of 125 Hz and has the duration of 100 ms between 200 ms and 300 ms, and an analysis region 3 is at the frequency of 125 Hz and has the duration of 100 ms between 400 ms and 500 ms, and a shape of a phase curve is calculated for each of the analysis regions 1 to 3. Then, a shape of a phase curve (i.e., a state of acceleration and deceleration by a vehicle) relative to one of the streaks (peaks) is calculated using the shapes of the phase curves. Specifically, since the phase curves are convex upward in the analysis regions 1 to 3 at the frequency of 125 Hz (three analysis regions in the streak (peak) in the highest frequency band shown by (b) of FIG. 20), it is determined that a vehicle is accelerating in the streak (peak) corresponding to the analysis regions 1 to 3. As a result, it is possible to determine a state of a vehicle with a higher degree of reliability. In contrast, since phase curves (not shown) are convex upward in analysis regions at the frequency of 40 Hz (three analysis regions in a streak (peak) in the lowest frequency band shown by (b) of FIG. 20), it is determined that a vehicle producing a vehicle sound corresponding to the streak (peak) at the frequency of 125 Hz and a vehicle producing a vehicle sound corresponding to the streak (peak) at the frequency of 40 Hz are different from each other. Consequently, it is possible to distinguish the vehicles with a higher degree of reliability, and thus to more accurately determine the number of the vehicles.

As above, the vehicle is less likely to frequently repeat the acceleration and deceleration in a short time, and the shapes of the phase curves such as especially the convex directions of the phase curves are often similar to each other within the predetermined duration. However, the phase of the engine sound in the actual environment is disturbed due to the influence of the surrounding noise or the like, and the resultant shape of the phase contains an error. In view of the above, it is possible to determine, with a higher degree of reliability, the shapes of the phase curves by determining states of the vehicles such as the acceleration of the vehicles based not on the shapes of the phase curves at a certain moment but on the shapes of the phase curves within the predetermined duration. As a result, it is also possible to increase the accuracy of determining the number of vehicles.

Moreover, although the vehicle sounds are classified into the groups based on the convex directions of the phase curves and the number of the vehicles is determined in this embodiment, the vehicle counting method is not limited to this. When plural vehicles are present, phase curves corresponding to vehicle sounds emanated from even the vehicles similarly accelerating have different degrees of convex (the quadratic coefficients $A_2$ in Equation 12). Here, the phase curves may be classified into groups based on the degrees of convex (the quadratic coefficients $A_2$ in Equation 12), and the number of vehicles may be determined.

Furthermore, although the shapes of the phase curves that are the quadratic curves are classified into the groups based on the convex directions of the quadratic curves (the degree of similarity among the quadratic coefficients of the quadratic curves (the uniformity of signs)) and the number of the vehicles is determined in this embodiment, the phase curve classification method is not limited to this. For example, a predetermined shape of a phase curve may be stored in advance, and shapes of phase curves may be classified into groups based on an error between the predetermined shape and each of the shapes. Specifically, a phase curve which is convex upward and has a certain curvature (hereinafter, referred to as a phase curve 1) and a phase curve which is convex downward and has a certain curvature (hereinafter, referred to as a phase curve 2) are stored in advance. An error between a phase at each time obtained from a detected vehicle sound and a phase on each phase curve is calculated, and a phase curve having a small error is used as a phase curve corresponding to the vehicle sound. Phase curves having a small error from the phase curve 1 may be classified into a group, and phase curves having a small error from the phase curve 2 may be classified into another group, thereby determining the number of the vehicles. This eliminates the need for calculating an approximate curve, resulting in reducing a processing load, and also produces an effect on an in-vehicle application required to instantly determine the number of the vehicles and notify the driver of the determined number of the vehicles.

Moreover, the number of vehicles may not be determined accurately, and it may be determined whether one or more vehicles are present. This produces the effect of the safe driving support for preventing the driver from being misled by mistakenly notifying the driver of the presence of the one vehicle even though the more vehicles are present.

The herein disclosed subject matter is to be considered descriptive and illustrative only, and the appended Claims are of a scope intended to cover and encompass not only the particular embodiment disclosed, but also equivalent structures, methods, and/or uses.

Moreover, although the vehicle sounds (phase curves) are classified into the groups based on the convex directions of the phase curves and the number of the vehicles is determined in this embodiment, the vehicle counting method is not limited to this. Each of the convex directions of the phase curves is considered as information indicating the acceleration and deceleration of a vehicle. Here, not only the vehicle sounds may be classified into the groups but also it may be determined whether or not the vehicles are accelerating or decelerating, and the notification may be switched based on the acceleration and deceleration.

For instance, as shown by (b) of FIG. 15, when the one vehicle is decelerating but the other vehicle is accelerating, the other vehicle is thought to be passing the one vehicle from behind or a blind spot. In contrast, when two vehicles are present and the both are decelerating, the vehicle in front is thought to be stopping, and the vehicle behind is also thought to be stopping accordingly. Here, these two cases may be distinguished, and the notification unit 106 may change a notification. For example, the notification unit 106 may switch between the notification modes in one of which only the number of vehicles is notified by "beep, beep", because of a low degree of danger, although the two vehicle are present in the latter case, and in other one of which the notification is made by "beep, beep, warning", because of a danger that the vehicle behind is passing in the former case. In this way, the effect of the safe driving support is produced by controlling the notification according to not only the number of the vehicles but also the combination of the acceleration and deceleration of the vehicles.

Embodiment 2

The following describes a vehicle counting device according to Embodiment 2.

In Embodiment 1, the vehicle counting device performs the frequency analysis on the vehicle sounds, calculates the phase curves from the phases resulting from the frequency analysis, and determines the number of the vehicles based on the phase curves. In contrast, in this embodiment, the vehicle counting device extracts one or more vehicle sounds from a mixed sound including vehicle sounds and noises such as a noise of the wind, based on phase curves, and determines the number of vehicles based on the extracted one or more vehicle sounds.

Figure 21:
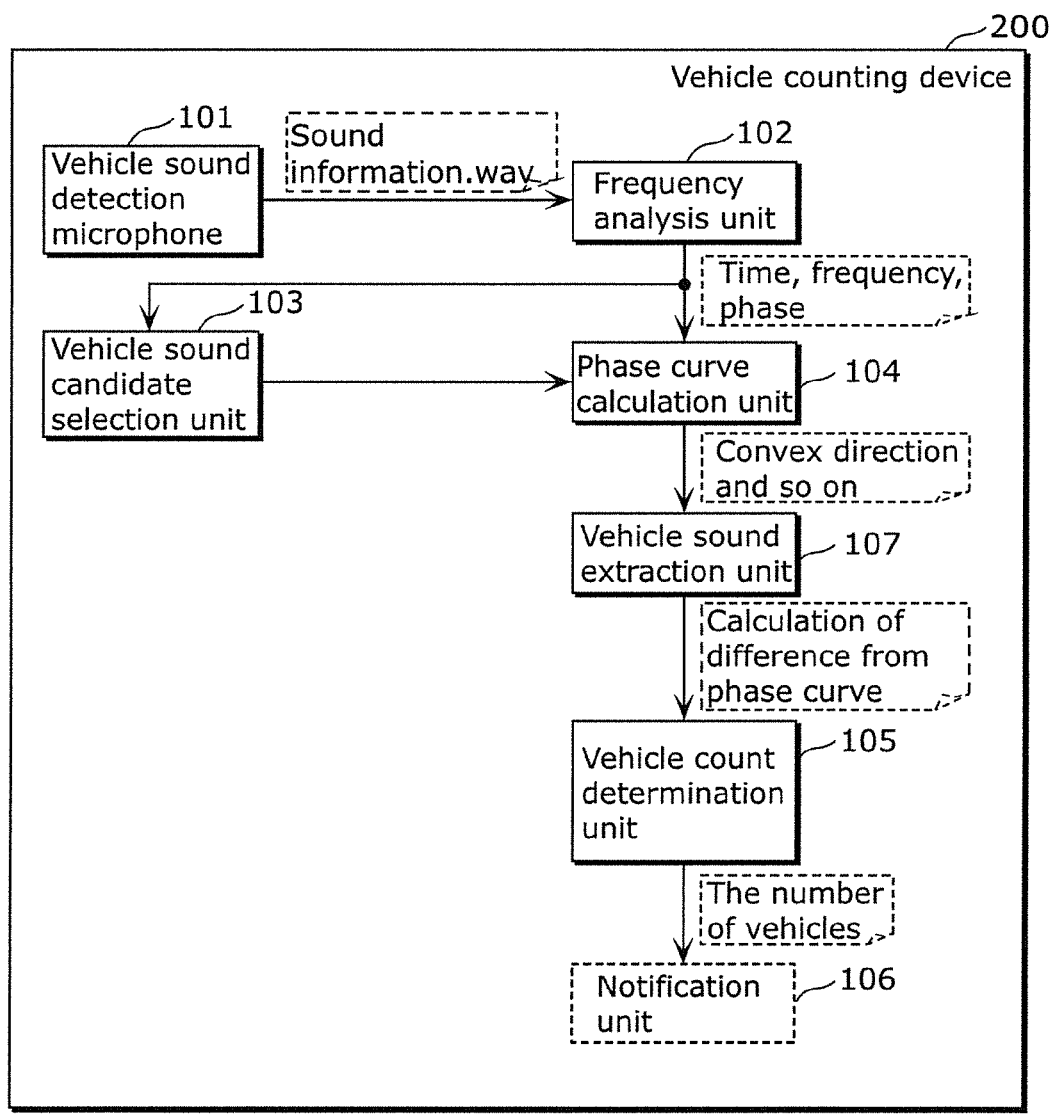
FIG. 21 is a block diagram showing a configuration of a vehicle counting device according to Embodiment 2.

FIG. 21 is a block diagram showing a configuration of a vehicle counting device 200 according to this embodiment which extracts one or more vehicle sounds from a mixed sound based on phase curves, and determines the number of vehicles based on the extracted one or more vehicle sounds. The vehicle counting device 200 further includes a vehicle sound extraction unit 107 in addition to the elements described in Embodiment 1. The same reference signs are assigned to the same elements as those in Embodiment 1, and descriptions thereof are omitted.

The vehicle sound extraction unit 107 extracts one or more vehicle sounds based on the phase curves calculated by the phase curve calculation unit 104. In other words, the vehicle sound extraction unit 107 calculates an error between a phase obtained from a result of the frequency analysis by the frequency analysis unit 102 and a phase on each of the phase curves calculated by the phase curve calculation unit 104, and extracts regions corresponding to the vehicle sounds from regions obtained from the result of the frequency analysis by the frequency analysis unit 102, based on the calculated error.

Then, the vehicle count determination unit 105 determines the number of the vehicles, using the phase curves in the regions corresponding to the vehicle sounds which are extracted by the vehicle sound extraction unit 107.

When, for instance, installed in the user vehicle and used in the actual environment, the vehicle counting device according to this embodiment is significantly influenced by a noise such as a surrounding environmental sound and a wind noise produced by the moving user vehicle.

Figure 22:
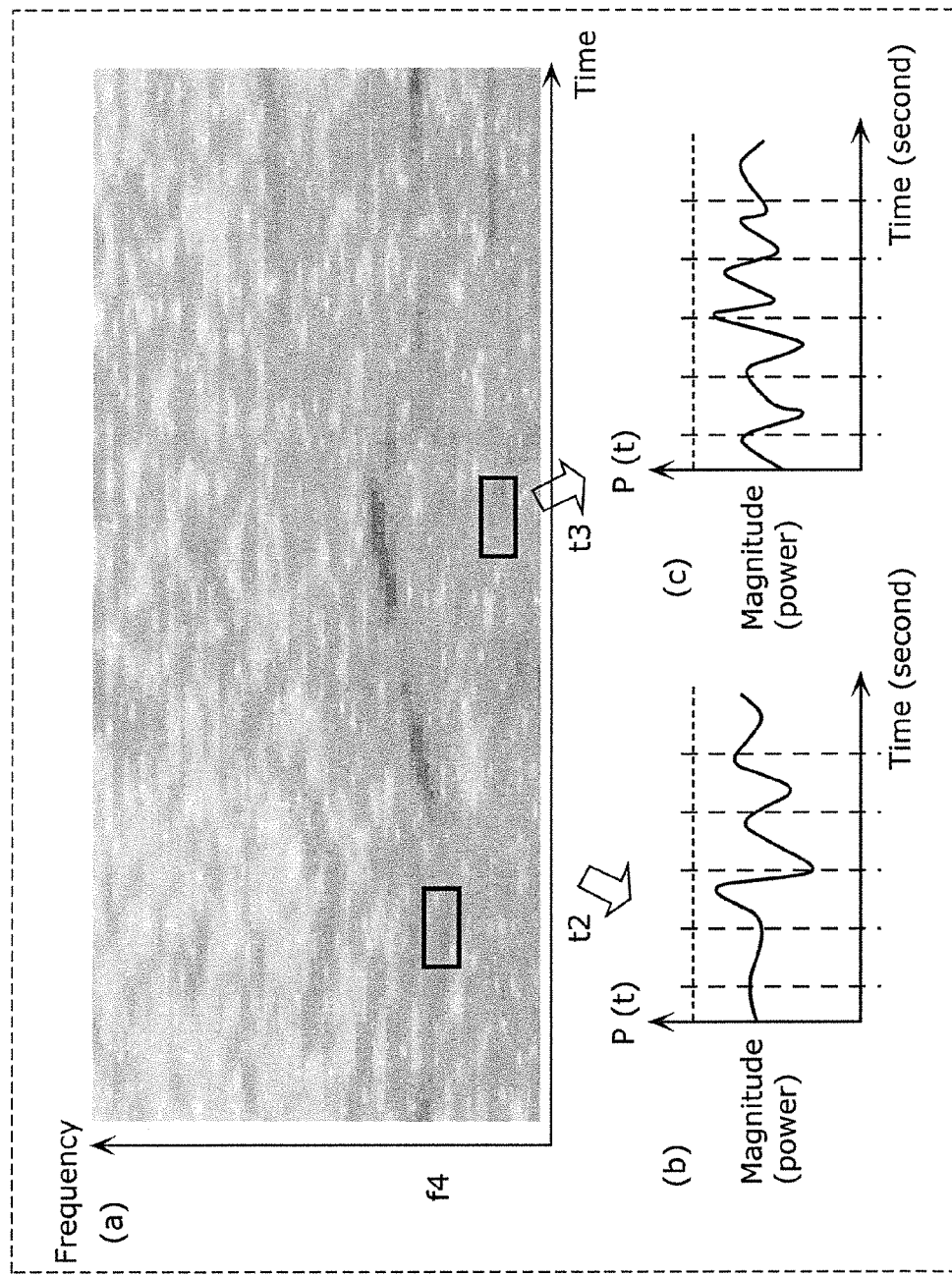
FIG. 22 is a graph illustrating mixed sound including a vehicle sound and a noise.

FIG. 22 is a diagram illustrating vehicle sounds and noises. (a) of FIG. 22 shows a result of a spectrum analysis on vehicle sounds and noises detected by the vehicle sound detection microphone 101 in the actual environment. Here, the horizontal axis represents time, and the horizontal axis represents a frequency. Dark blackish portions indicate high-power portions. In comparison with FIG. 7, FIG. 15, or the like, (a) of FIG. 20 is darker as a whole. (a) of FIG. 20 shows that the noises such as a noise of the wind are great and portions other than portions representing engine sounds indicate high power. A time t2 corresponds to a portion representing an engine sound, and (b) of FIG. 22 shows power at the time t2. In contrast, a time t3 corresponds to a portion representing a noise, and (c) of FIG. 22 shows power at the time t3. In a comparison of the power, there is a case where the noise may have the power similar to that of the engine sound, and there is a case where a vehicle sound cannot be accurately extracted based only on a threshold value of the power, for example. In view of the above, in this embodiment, the vehicle sound is more accurately extracted based on a phase curve.

Figure 23:
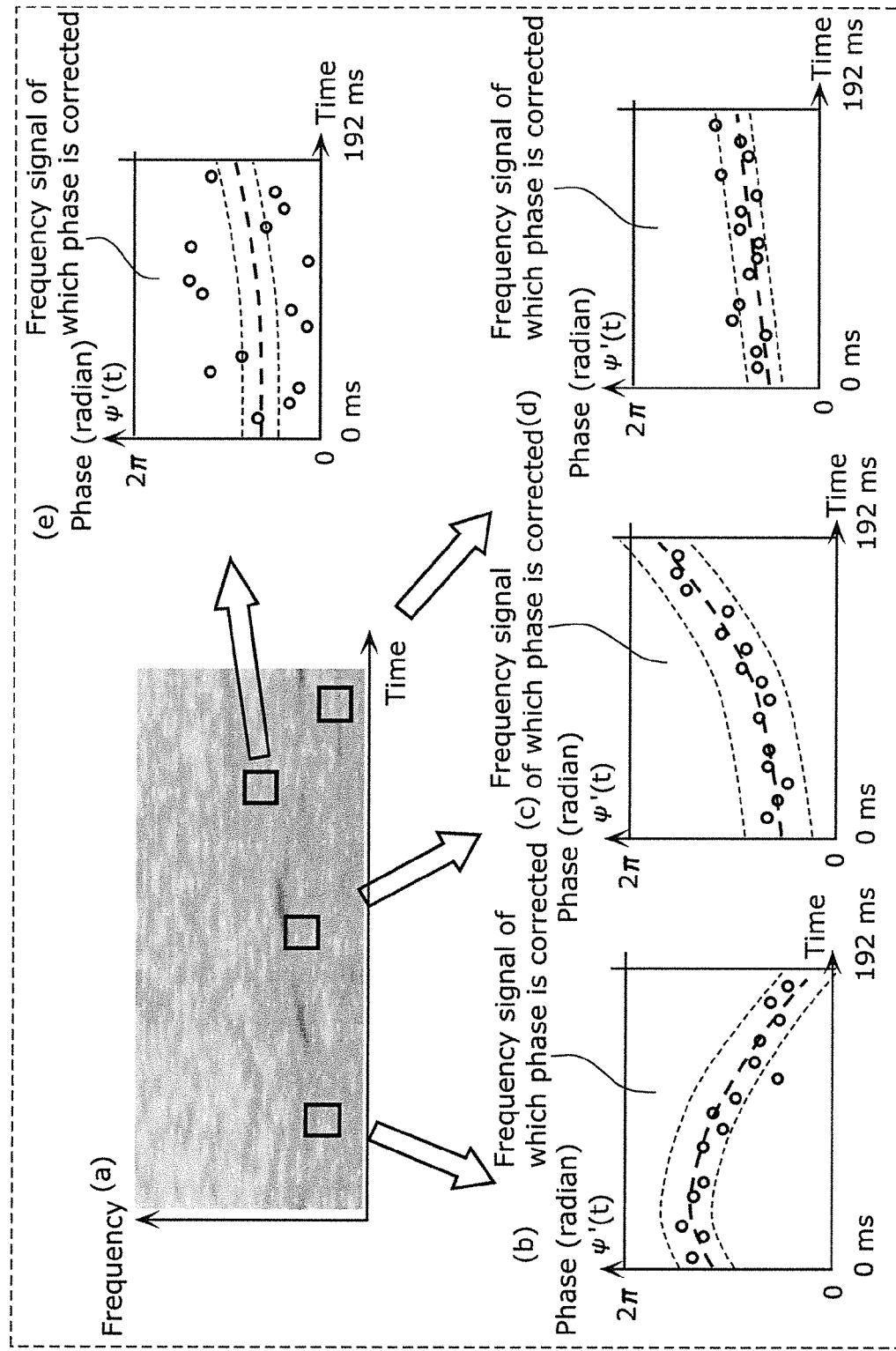
FIG. 23 is a graph illustrating a phase curve corresponding to a vehicle sound and a noise.

FIG. 23 is a diagram illustrating a method of extracting a vehicle sound, which is performed by the vehicle sound extraction unit 107. Similar to (a) of FIG. 22, (a) of FIG. 23 is a spectrogram for a mixed sound. (b) of FIG. 23 shows an analysis result of a phase in a region which is a portion representing an engine sound of a vehicle and in which the vehicle is decelerating in the spectrogram shown by (a) of FIG. 23. The horizontal axis represents time, and the vertical axis represents a phase. Each of circles represents a value of a phase (corrected phase) at each of actual times. As described in Embodiment 1, the phase curve calculation unit 104 calculates a quadratic curve that is convex upward. The quadratic curve is represented by a dotted line. Here, the vehicle sound extraction unit 107 determines whether or not the region indicates the vehicle sound. For instance, the vehicle sound extraction unit 107 calculates an error from the quadratic curve, and determines that the region indicates the vehicle sound, when the error is less than a predetermined threshold value, and determines that the region indicates the noise, when the error is greater or equal to the predetermined threshold value. The error is calculated according to the summation of residual absolute values, for example. In other words, the error is calculated by summing up absolute values of errors between values of an actual phase and values of a quadratic curve at corresponding times and time averaging the summed absolute values. It is to be noted that an error assessment method is not limited to the above, and as long as assessment methods provide an index indicating how deviated a region to be analyzed is from a phase curve, any of the assessment methods may be employed.

In the case of the example shown by (b) of FIG. 23, an error between the quadratic curve corresponding to the phase and the values of the actual phase is small, and thus the region is extracted as indicating the vehicle sound.

In contrast, (c) of FIG. 23 shows an analysis result in a region in which the vehicle is accelerating. The phase curve calculation unit 104 calculates a quadratic curve that is convex downward, in the region. Similar to the case shown by (b) of FIG. 23, an error between an actual phase and the quadratic curve is small, and thus the region is also extracted as indicating the vehicle sound.

Furthermore, (d) of FIG. 23 shows an analysis result in a region in which the vehicle is moving at a constant speed. The phase curve calculation unit 104 calculates a line with a quadratic coefficient of 0. In this case also, an error between an actual phase and the curve (to be more exact, the line) is small, and thus the region is extracted as indicating the vehicle sound.

In contrast, (e) of FIG. 23 shows an analysis result in a region for a noise of the wind. Unlike the engine sound, the noise of the wind is produced by combining sudden Karman vortices. Although the noise of the wind has power on a spectrum to the extent that the noise of the wind is indistinguishable from the engine sound, the noise of the wind differs from the engine sound in that values of a phase of the noise of the wind are nonuniform. Thus, an error between each value of the phase and a calculated phase curve becomes great. Referring to (e) of FIG. 23, although the phase curve is calculated, an error between the phase curve and each value (an actual phase) is large, and an error of the phase in the region becomes significantly great.

Figure 24:
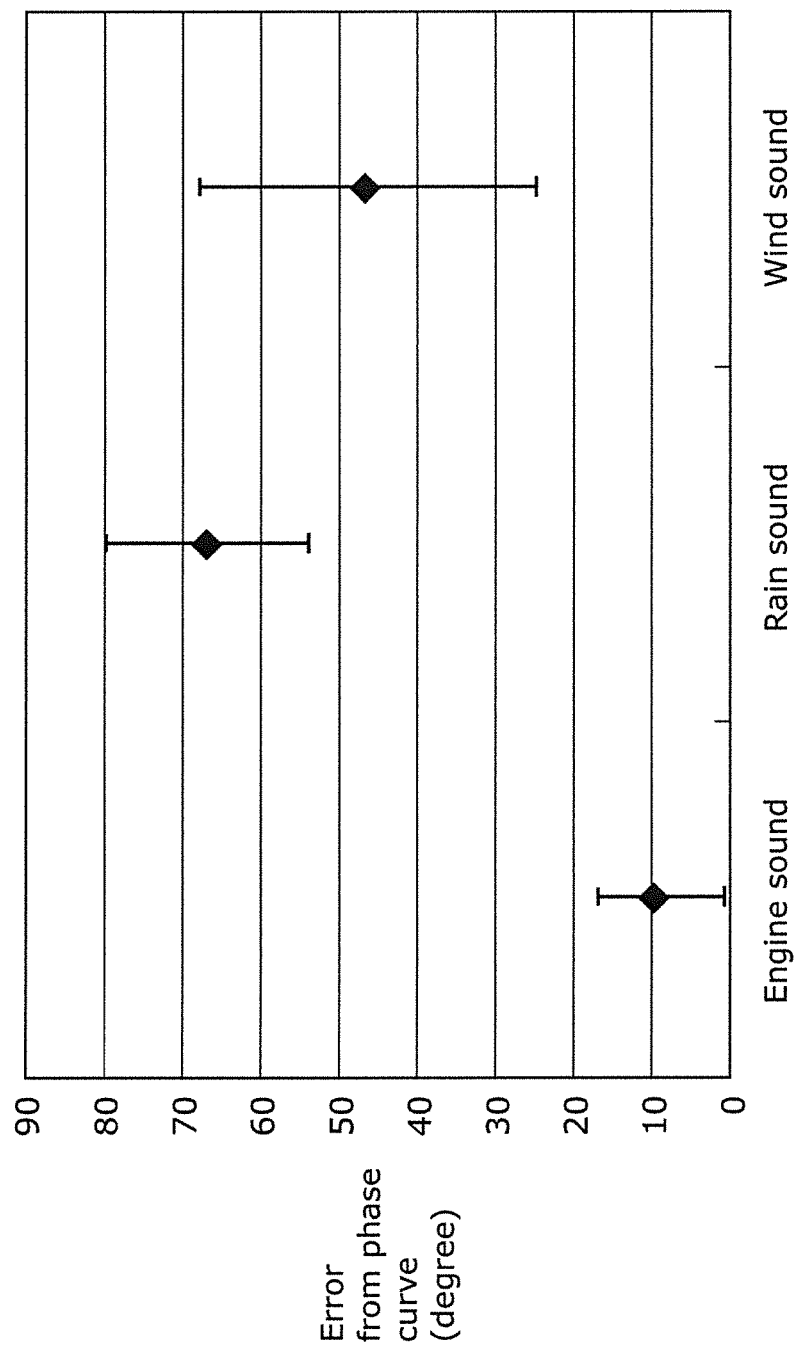
FIG. 24 is a graph illustrating a method of extracting a vehicle sound.

FIG. 24 is a graph illustrating, for an engine sound and a noise of the wind, errors from phase curves. Here, the vertical axis represents an error with a degree (phase difference). A result is obtained which shows that an error of an actually detected engine sound is indicated by 10 degrees, while an error of a noise of the wind is indicated by 50 degrees. In view of the above, for instance, a threshold value (e.g., 20 degrees) is set to an error, and a vehicle sound may be extracted using the threshold value.

Figure 25:
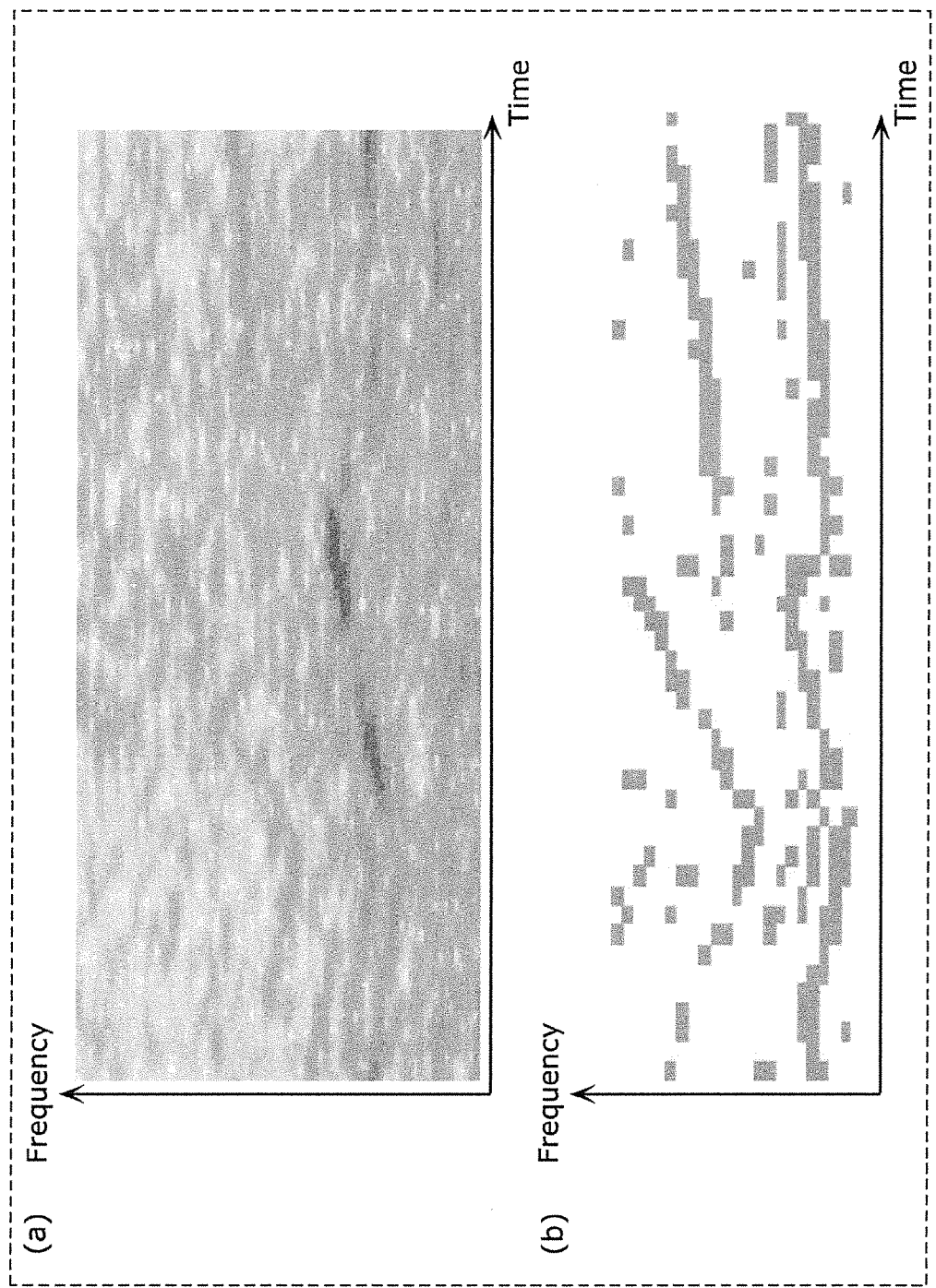
FIG. 25 is a graph illustrating an exemplary extracted vehicle sound.

FIG. 25 is a diagram illustrating an exemplary result of extraction of vehicle sounds which is performed by the vehicle sound extraction unit 107. Similar to (a) of FIG. 23, (a) of FIG. 25 is a spectrogram for a mixed sound including actually detected engine sounds and a noise of the wind. (b) of FIG. 25 shows the engine sounds in the spectrogram shown by (a) of FIG. 25 which are extracted by the vehicle sound extraction unit 107. Here, the horizontal axis represents time, and the horizontal axis represents a frequency. Extracted regions are filled in with black and displayed. The noise is removed, and only the engine sounds are accurately extracted.

It is to be noted that in this embodiment, the vehicle count determination unit 105 uses the method described in Embodiment 1 to determine the number of the vehicles, using the regions extracted by the vehicle sound extraction unit 107.

Figure 26:
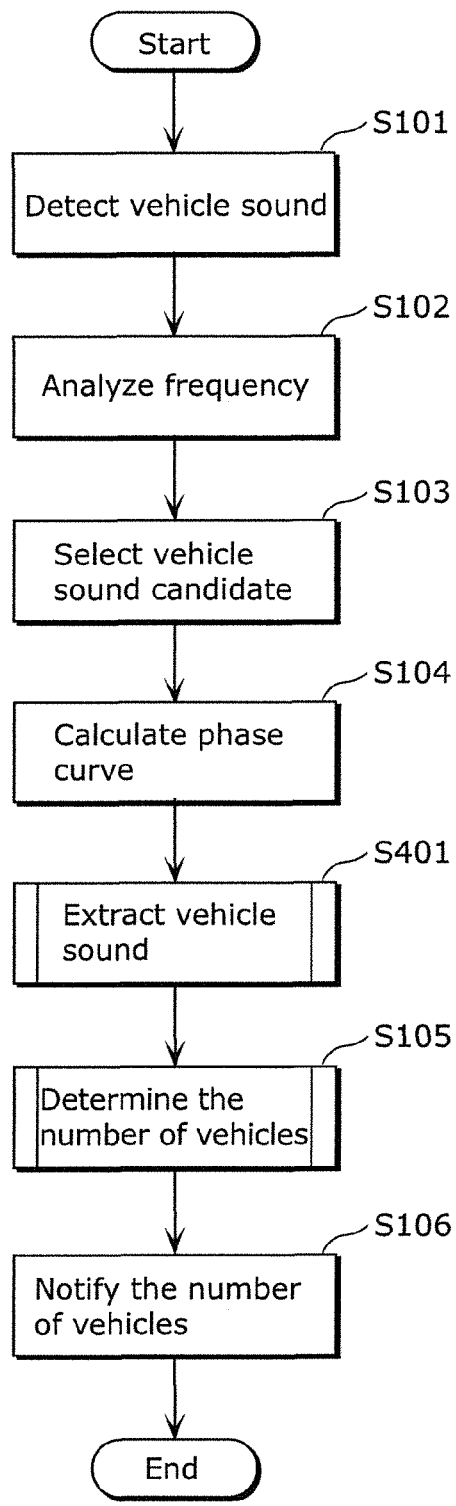
FIG. 26 is a flow chart showing operations of the vehicle counting device according to Embodiment 2.
Figure 27:
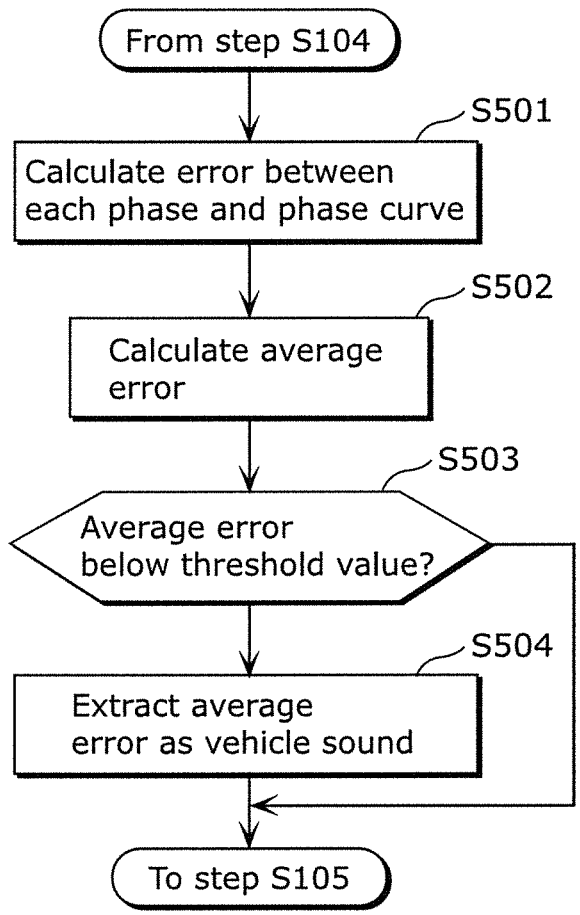
FIG. 27 is a flow chart showing details of step S401 shown by FIG. 26.

The following describes operations of the vehicle counting device 200 according to this embodiment with reference to flow charts shown by FIGS. 26 and 27.

The same reference signs are assigned to the same steps as those in Embodiment 1, and descriptions thereof are omitted.

A step (step S401) is added in which the vehicle sound extraction unit 107 extracts vehicle sounds after the phase curve calculation unit 104 calculates the phase curves as described in Embodiment 1 (step S104).

In the step S401, first, the vehicle sound extraction unit 107 calculates an error between a phase at each time which is obtained from the result of the frequency analysis by the frequency analysis unit 102 and each of the phase curves calculated by the phase curve calculation unit 104 (step S501), and calculates an average of the errors (step S502). Then, the vehicle sound extraction unit 107 determines whether or not the average is less than a predetermined threshold value (e.g., 20 degrees) (step S503), and extracts, when the average is determined to be less than the threshold value (Yes in step S503), one or more regions in a spectrogram corresponding to each time as one or more vehicle sounds (step S504). Subsequently, the vehicle count determination unit 105 uses the method described in Embodiment 1 to determine the number of vehicles, using the one or more regions extracted by the vehicle sound extraction unit 107 (step S105). Finally, the notification unit 106 performs a notification according to the number of the vehicles determined by the vehicle count determination unit 105 (step S106).

As described above, the vehicle counting device 200 according to this embodiment extracts the one or more vehicle sounds from the mixed sound based on the phase curves, determines the number of the vehicles based on the extracted one or more vehicle sounds, and notifies the driver of the number of the vehicles. In addition, the method described in this embodiment makes it possible to accurately extract the one or more vehicle sounds even in an environment with noises such as a wind noise produced by a moving vehicle, to determine the number of the vehicles based on the one or more vehicle sounds, and to notify the number of the vehicles.

Although the vehicle counting device is described in the embodiments and modifications disclosed herein, the present disclosure is not limited to the embodiments and modifications.

For instance, any of the elements in the embodiments and modifications disclosed herein may be arbitrarily combined within the scope of the present disclosure.

Moreover, it should be considered that the embodiments and modifications disclosed herein are exemplary in all respects and not restrictive at all. It is intended that the scope of the present disclosure is indicated not by the above description of the embodiments but by the claims, and that all changes that have equivalent meaning as and fall within the claims are included in the scope of the present disclosure.

Moreover, the elements included in the vehicle counting device according to the embodiments may be implemented as hardware such as a dedicated electronic circuit, or may be configured as a computer system including a microprocessor, a ROM, a RAM, a hard disk drive, a display unit, a keyboard, a mouse, and so on. A computer program is stored in the RAM or the hard disk drive. Each of systems or devices achieves its functions as a result of the microprocessor operating according to the computer program. Here, in order to achieve predetermined functions, the computer program is configured by combining a plurality of instruction codes indicating instructions for a computer.

Furthermore, part or all of the elements included in the vehicle counting device according to the embodiments and modifications may be configured from one system LSI (Large Scale Integration). The system LSI is a super-multifunctional LSI manufactured with a plurality of components integrated on a single chip, and specifically is a computer system including a microprocessor, a ROM, and a RAM, for example. A computer program is stored in the RAM. The system LSI achieves its functions as a result of the microprocessor operating according to the computer program.

Still furthermore, part or all of the elements included in the vehicle counting device according to the embodiments and modifications may be configured from a IC card detachable from each system or each device or a stand-alone module. The IC card or the module is a computer system including a microprocessor, a ROM, a RAM, and so on. The IC card or the module may include the super-multifunctional LSI. The IC card or the module achieves its functions as a result of the microprocessor operating according to a computer program. The IC card or the module may have tamper-resistance.

Moreover, the vehicle counting device in the present disclosure may be realized as the above-described method (the vehicle counting method). In addition, the vehicle counting device in the present disclosure may be a computer program realizing these methods with a computer, or a digital signal of the computer program.

Furthermore, the vehicle counting device and the vehicle counting method in the present disclosure may be realized as a non-transitory computer-readable recording medium on which the computer program or the digital signal is recorded, such as a flexible disk, a hard disk, a CD-ROM, an MO, a DVD, a DVD-ROM, a DVD-RAM, a BD (Blu-ray Disc (registered trademark)), and a semiconductor memory. In addition, the vehicle counting device and the vehicle counting method in the present disclosure may be the digital signal recorded on the non-transitory computer-readable recording medium.

Moreover, the computer program or the digital signal may be transmitted via, for instance, an electric telecommunication line, a wireless or wired communication line, a network such as the Internet, or data broadcasting.

Furthermore, the vehicle counting device and the vehicle counting method in the present disclosure may be a computer system including a microprocessor and a memory storing the computer program, wherein the memory stores the computer program and the microprocessor operates according to the computer program.

Moreover, another independent computer system may execute the computer program or the digital signal that is recorded on the non-transitory computer-readable recording medium and transmitted to the other independent computer system or that is transmitted via the network or the like to the other independent computer system.

INDUSTRIAL APPLICABILITY

One or more exemplary embodiments disclosed herein are applicable to devices that determine the number of vehicles, and particularly to a device that detects the presence or absence of any vehicle and the number of vehicles, using one or more vehicle sounds from at least one vehicle around a user vehicle.

The invention claimed is:

1. A vehicle navigation system for use in a first vehicle, said vehicle navigation system comprising:
a processor; and
a memory storing instructions that, when executed by the processor, cause the navigation system to:
analyze a frequency of a surrounding sound that includes one or more vehicle sounds and is detected by a vehicle sound detection microphone;
select, as one or more vehicle sound candidates, one or more sounds included in the surrounding sound, based on a result of the analysis of the surrounding sound, each of the one or more sounds being in a frequency band where a sound pressure is greater than or equal to a predetermined threshold value;
calculate, for each of the selected one or more vehicle sound candidates, a phase curve indicating a time dependency of a phase;
classify the calculated one or more phase curves into at least one group, based on shapes of the calculated one or more phase curves, and determine a total number of the at least one group as the number of the vehicles approaching the first vehicle; and
notify a driver of the first vehicle of the determined number of the vehicles approaching the first vehicle.

2. The vehicle navigation system according to claim 1, wherein, for each of the selected one or more vehicle sound candidates, a quadratic approximate curve is calculated as the phase curve, based on a phase of a signal in each of time periods, the signal indicating the vehicle sound candidate.

3. The vehicle navigation system according to claim 2, wherein the calculated one or more phase curves are classified into the at least one group, based on a degree of similarity among quadratic coefficients of the one or more calculated quadratic approximate curves.

4. The vehicle navigation system according to claim 1, wherein the instructions, when executed by the processor, further cause the navigation system to:
calculate an error between a phase resulting from the analysis of the frequency of the surrounding sound and a phase on the calculated phase curve, and extract, from regions resulting from the analysis of the frequency of the surrounding sound, a region corresponding to a vehicle sound, based on the calculated error, and
determine the number of the vehicles approaching the first vehicle, using a phase curve in the extracted region corresponding to the vehicle sound.

5. The vehicle navigation system according to claim 1, wherein the driver of the first vehicle is notified of the determined number of the vehicles approaching the first vehicle in different modes depending on whether the determined number of the vehicles approaching the first vehicle is one or plural.

6. The vehicle navigation system according to claim 1, wherein the driver of the first vehicle is notified of the determined number of the vehicles approaching the first vehicle by sound.

7. A computer-implemented approaching vehicle detection method for use by a vehicle navigation system, the approaching vehicle detecting method determining the number of vehicles approaching a first vehicle, using one or more vehicle sounds, the approaching vehicle detection method comprising:
analyzing, using a processor of the vehicle navigation system, a frequency of a surrounding sound including the one or more vehicle sounds, the surrounding sound being detected by a vehicle sound detection microphone;
selecting, using the processor of the vehicle navigation system, as one or more vehicle sound candidates, one or more sounds included in the surrounding sound, based on a result of the analysis in the analyzing, each of the one or more sounds being in a frequency band where a sound pressure is greater than or equal to a predetermined threshold value;

calculating, using the processor of the vehicle navigation system, for each of the selected one or more vehicle sound candidates, a phase curve indicating a time dependency of a phase;

classifying, using the processor of the vehicle navigation system, the calculated one or more phase curves into at least one group based on shapes of the calculated one or more phase curves, and determining a total number of the at least one group as the number of the vehicles approaching the first vehicle; and notifying, using the processor of the vehicle navigation system, a driver of the first vehicle of the determined number of the vehicles approaching the first vehicle.

8. A non-transitory computer-readable recording medium for use in a computer, the recording medium having a computer program recorded thereon for causing the computer to execute the approaching vehicle detection method according to claim 7.

* * * * *